Aug. 30, 1960
L. MARKLE
2,950,786
BUILDING SYSTEM
Filed Jan. 27, 1954
16 Sheets-Sheet 2
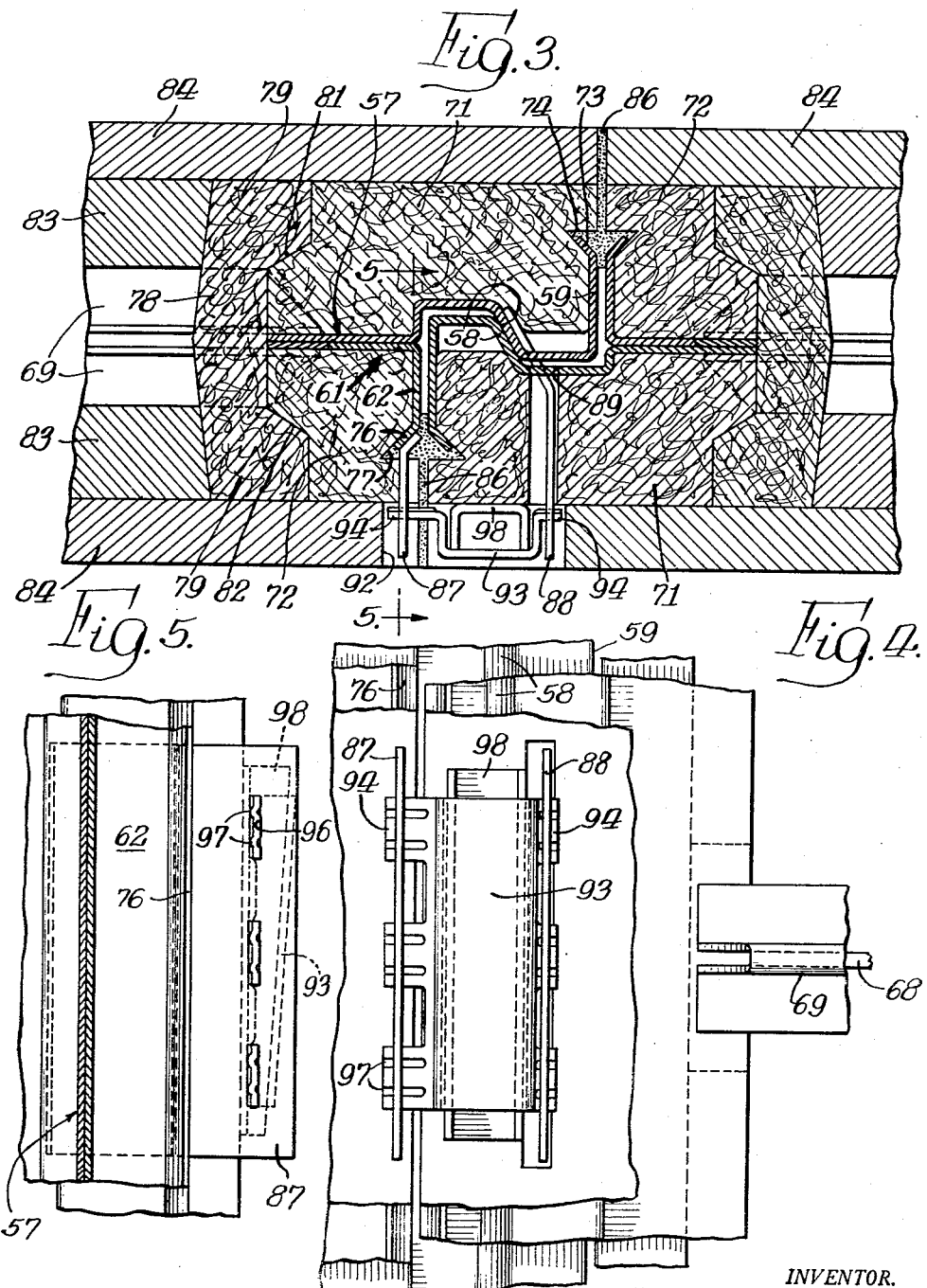
INVENTOR.
Lafayette Markle, Aug. 30, 1960 L. MARKLE 2,950,786
BUILDING SYSTEM
Filed Jan. 27, 1954 16 Sheets-Sheet 3
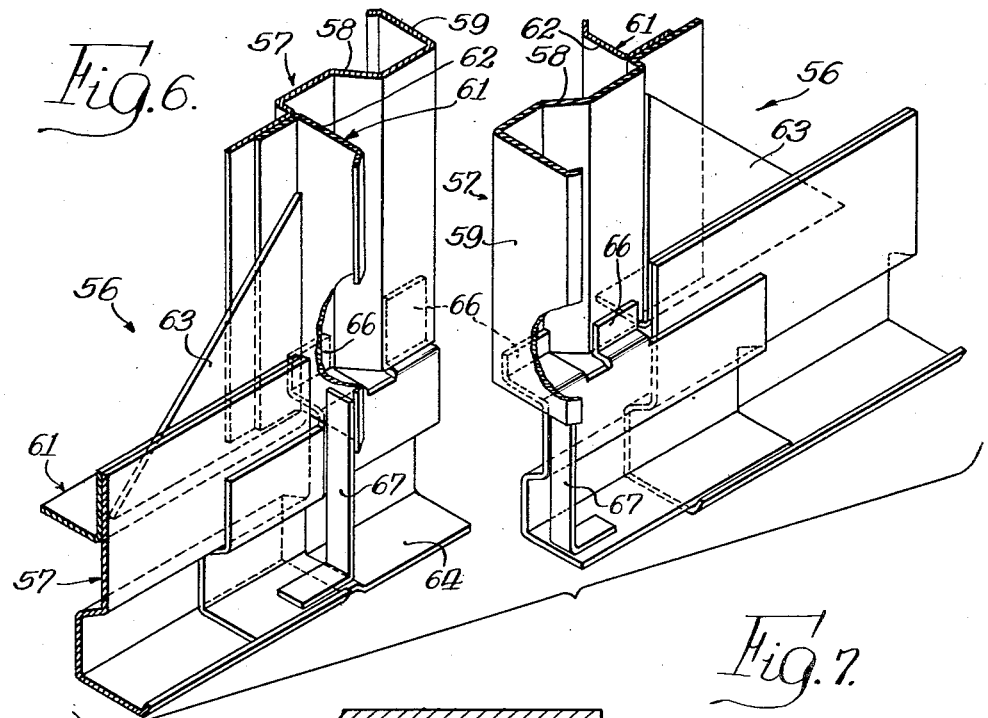
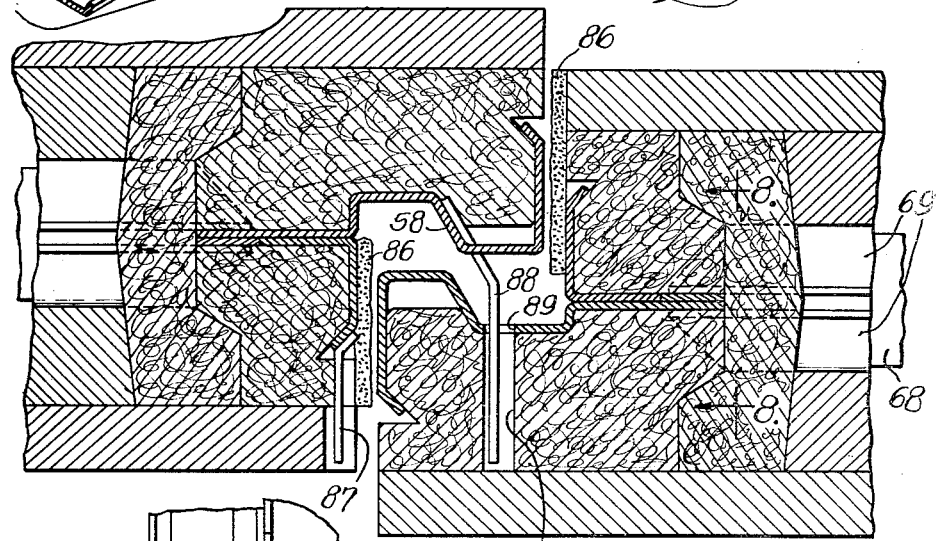
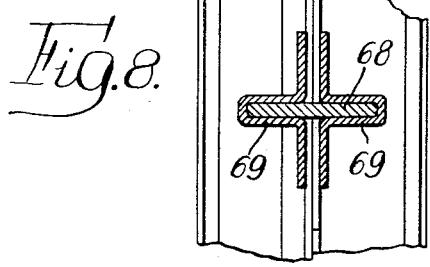
INVENTOR.
Lafayette Markle,
BY
Davis, Lindsey, Hibben - Noyes Attys.

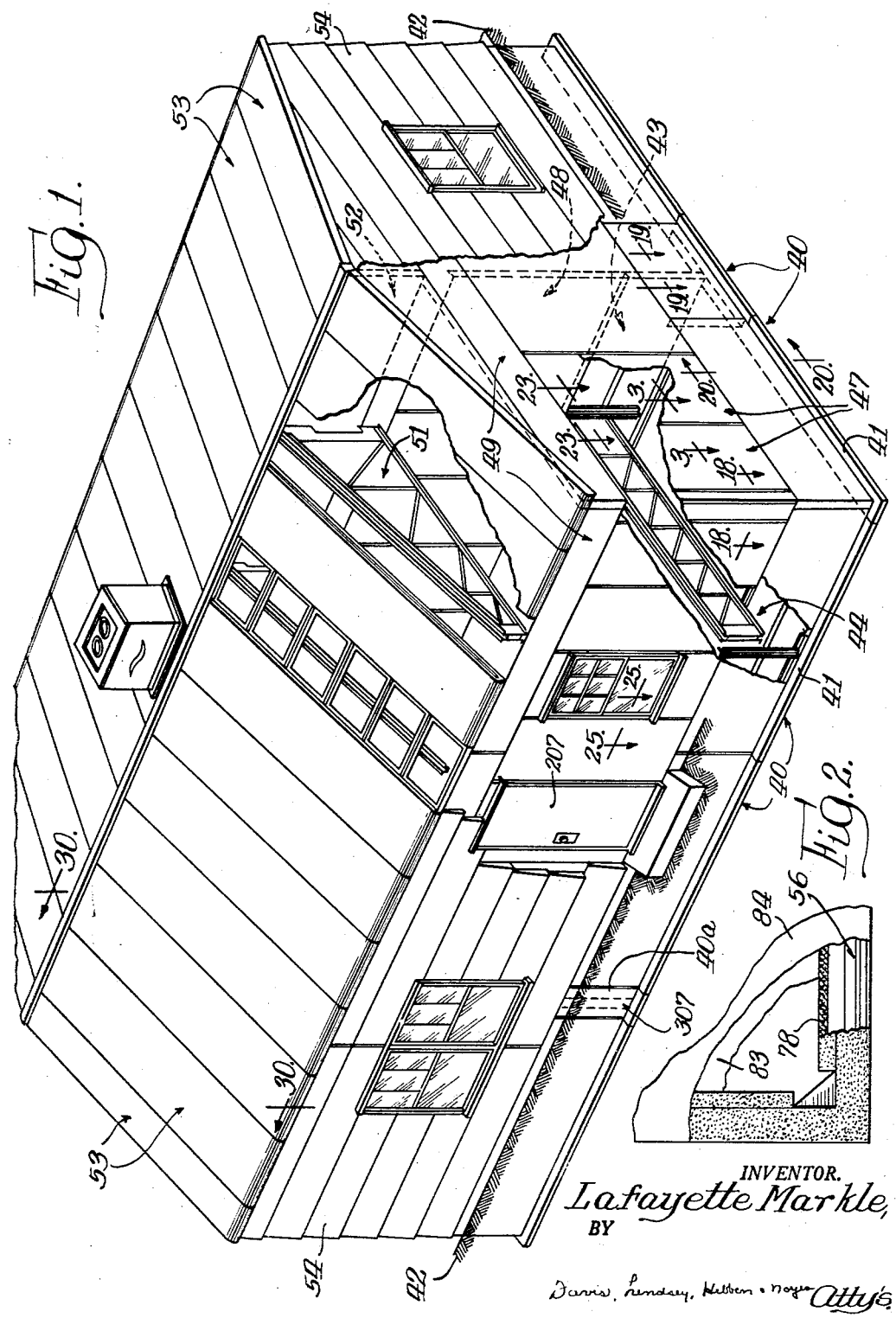

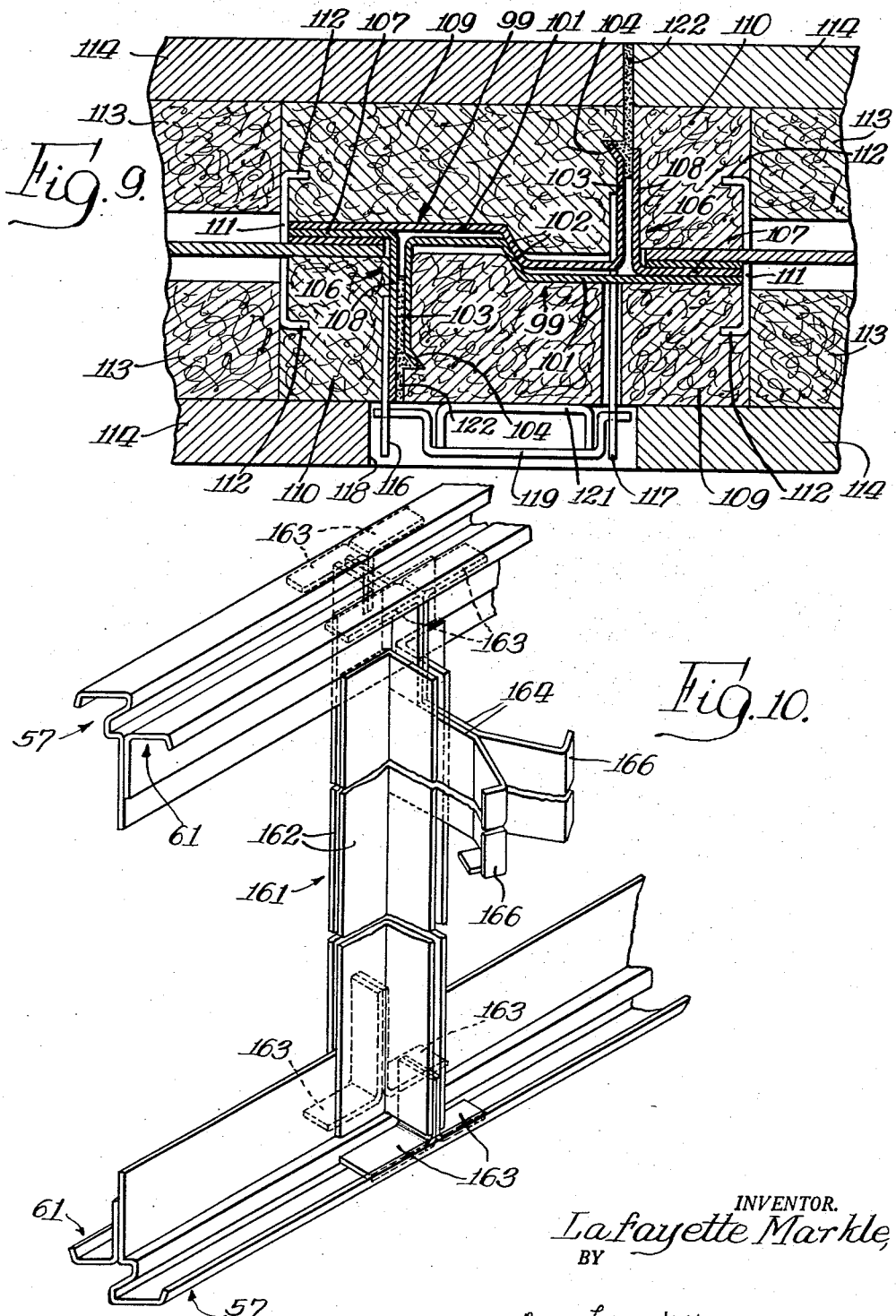

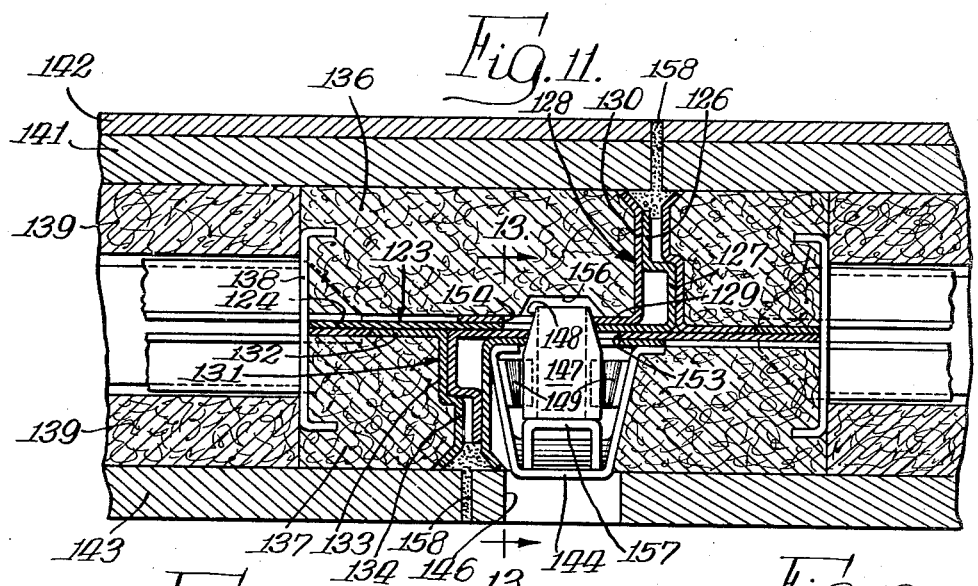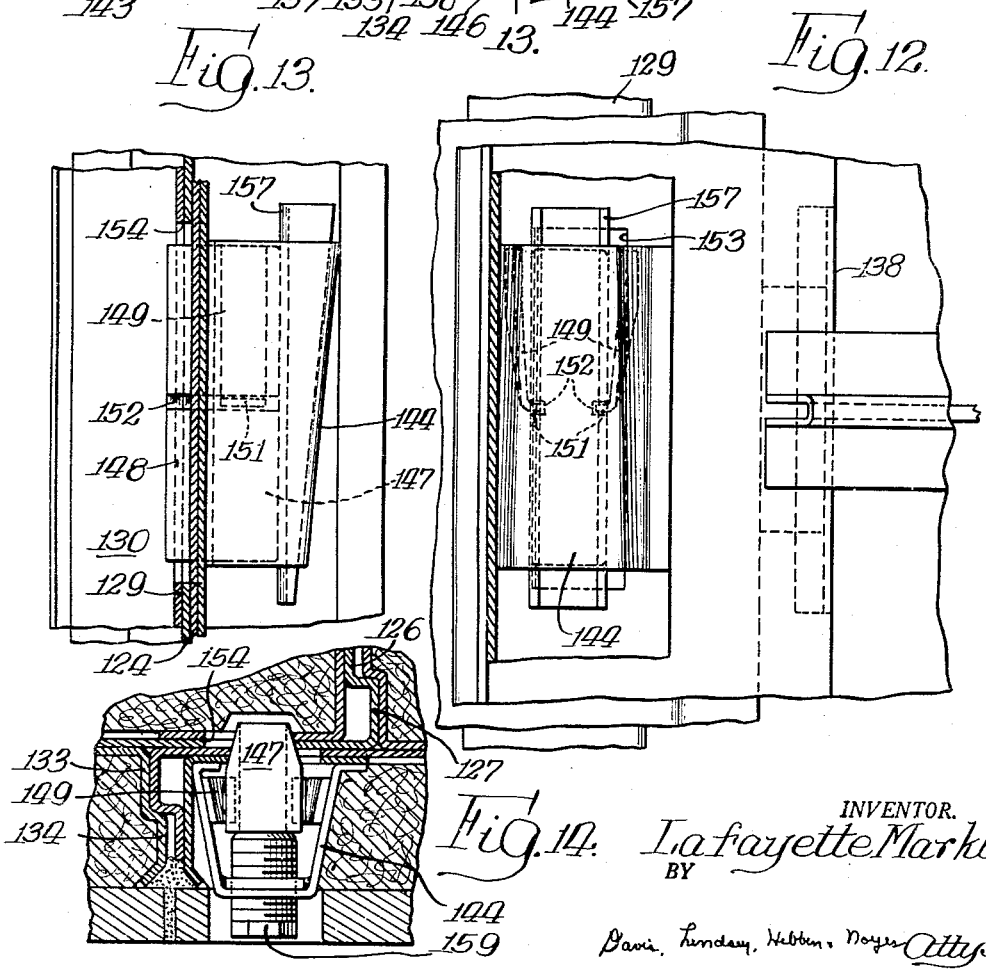

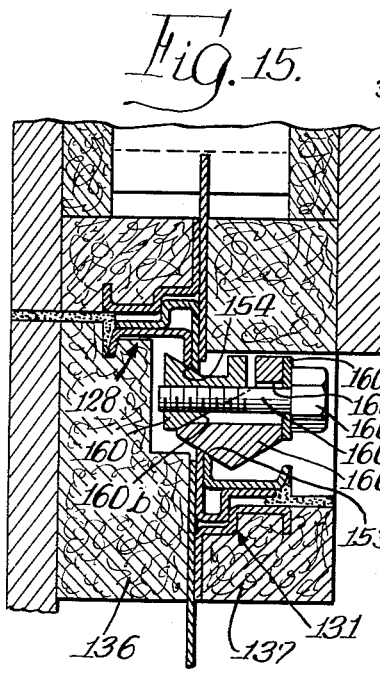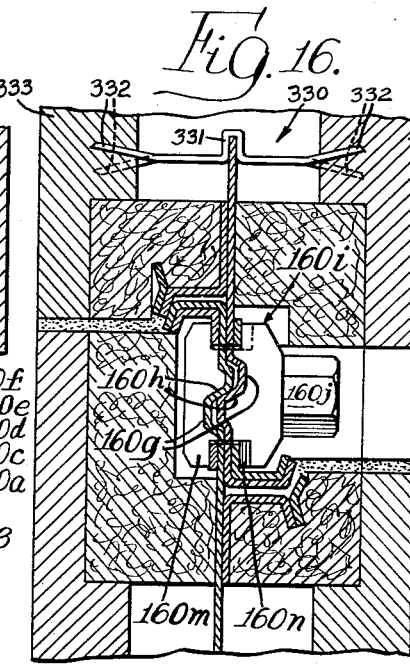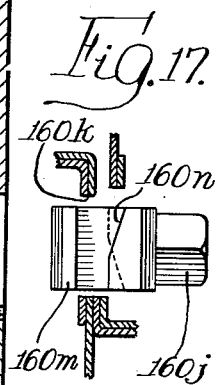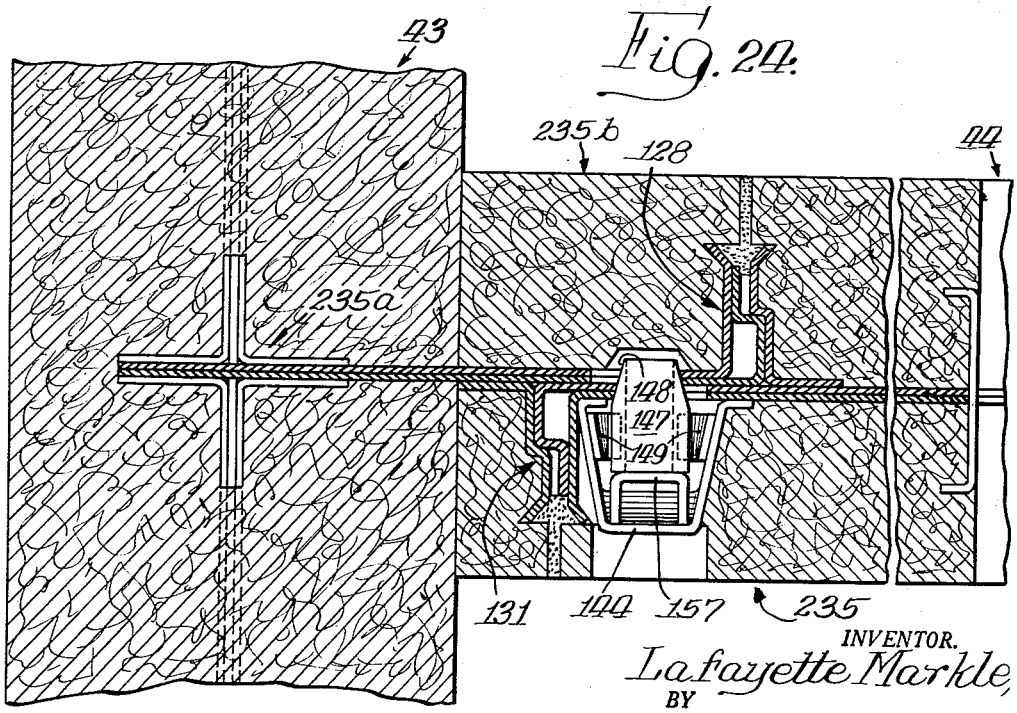

Aug. 30, 1960

L. MARKLE 2,950,786

BUILDING SYSTEM

Filed Jan. 27, 1954

INVENTOR.
Lafayette Markle,
BY
Davis, Lindsey, Hibben & Noyes Atty's.

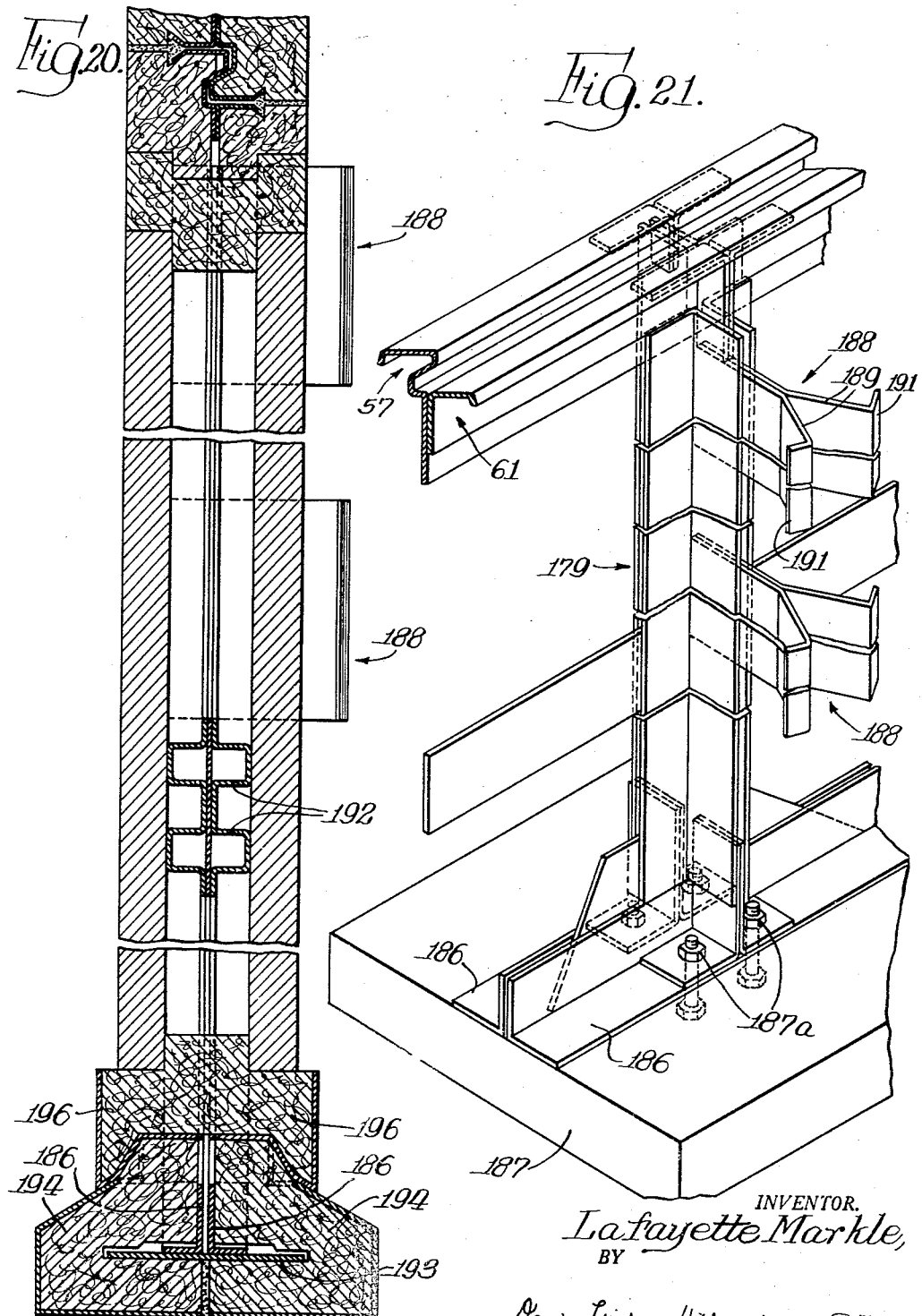

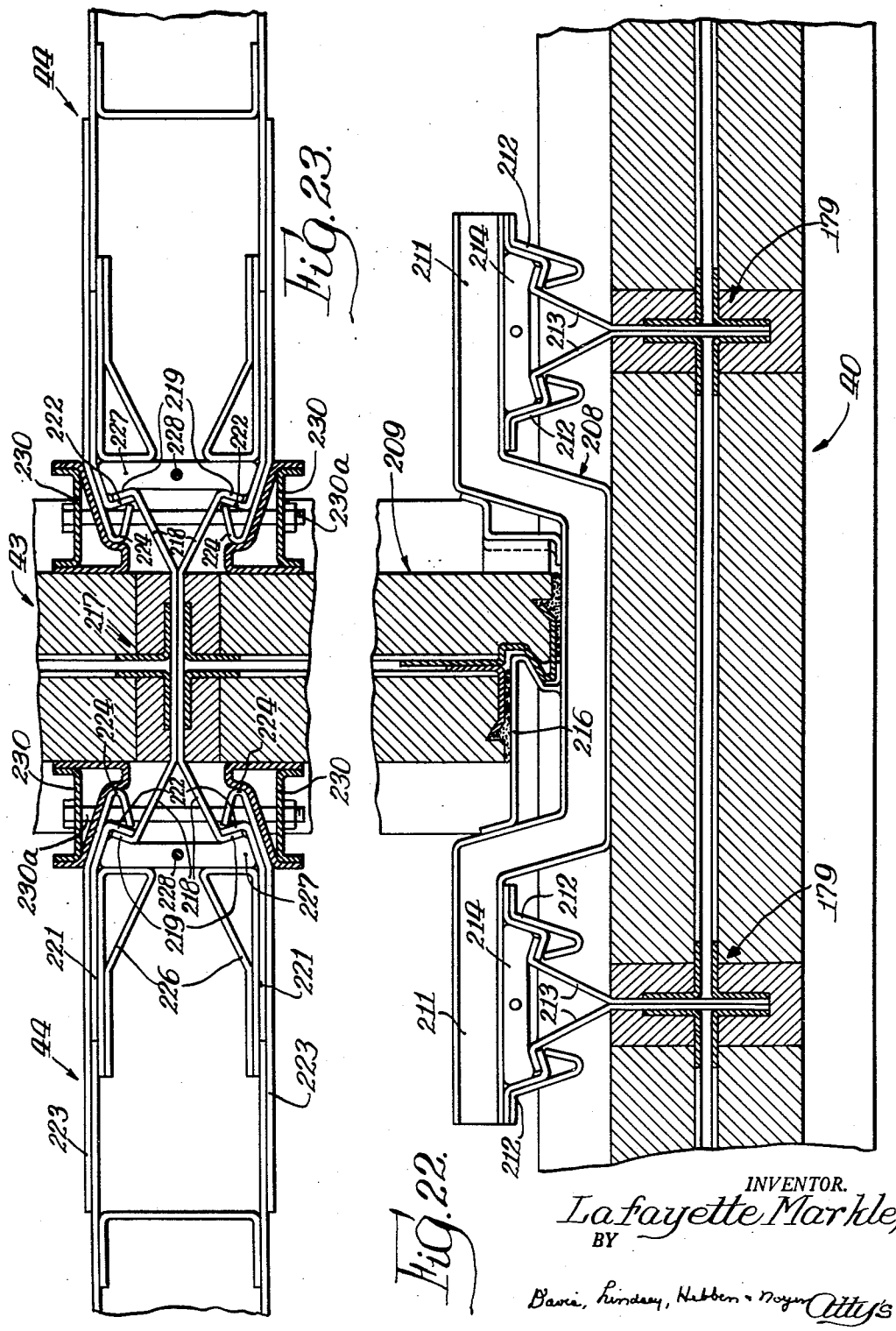

Aug. 30, 1960 L. MARKLE 2,950,786
BUILDING SYSTEM
Filed Jan. 27, 1954 16 Sheets-Sheet 10
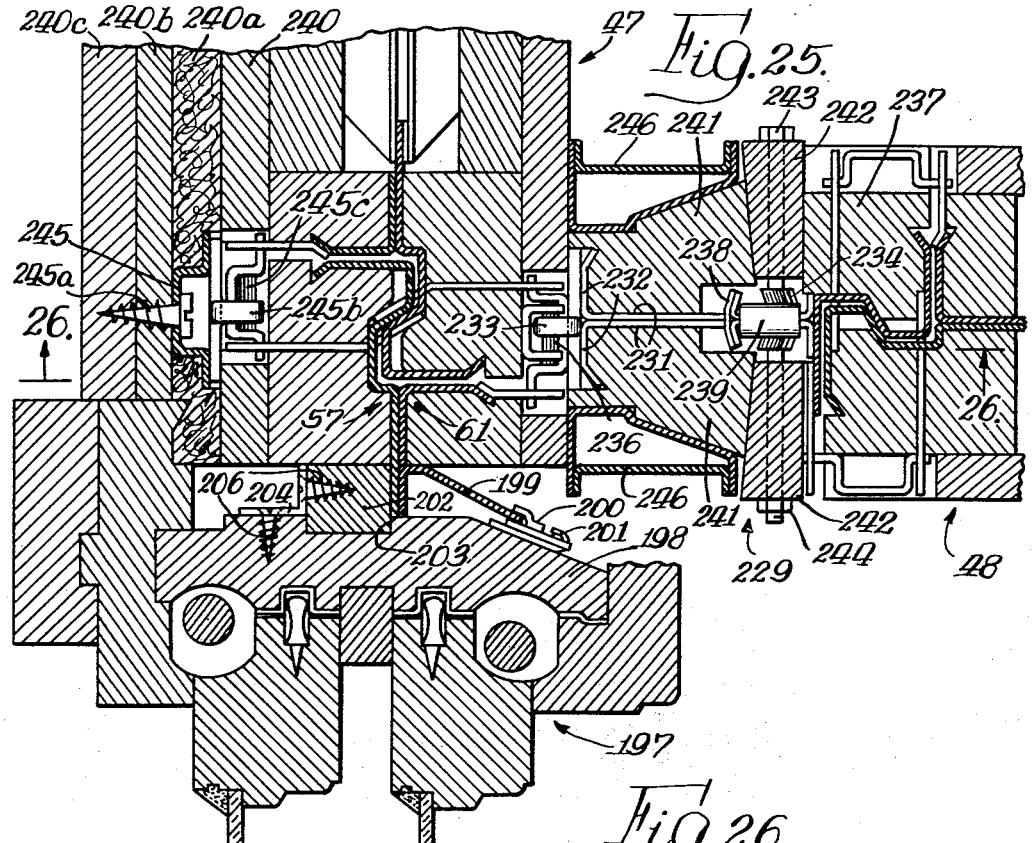
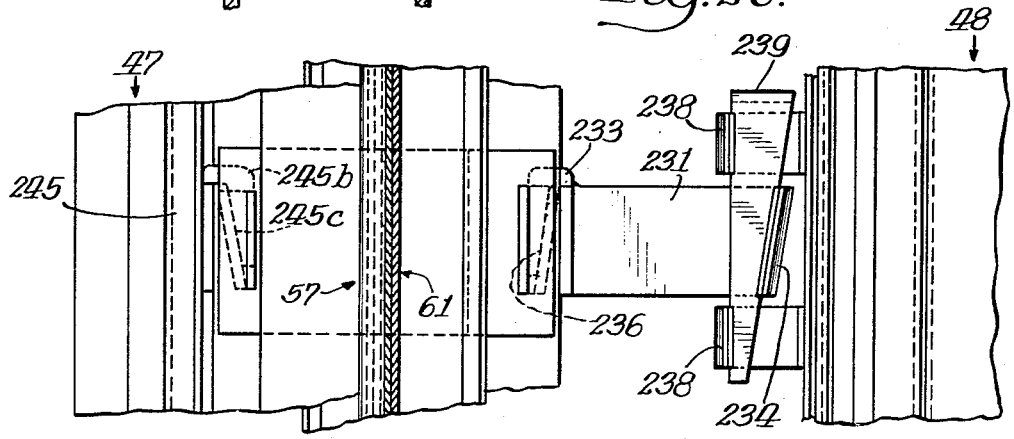
INVENTOR.
Lafayette Markle,
BY
Davis, Lindsey, Hibben, Noyes Atty's.

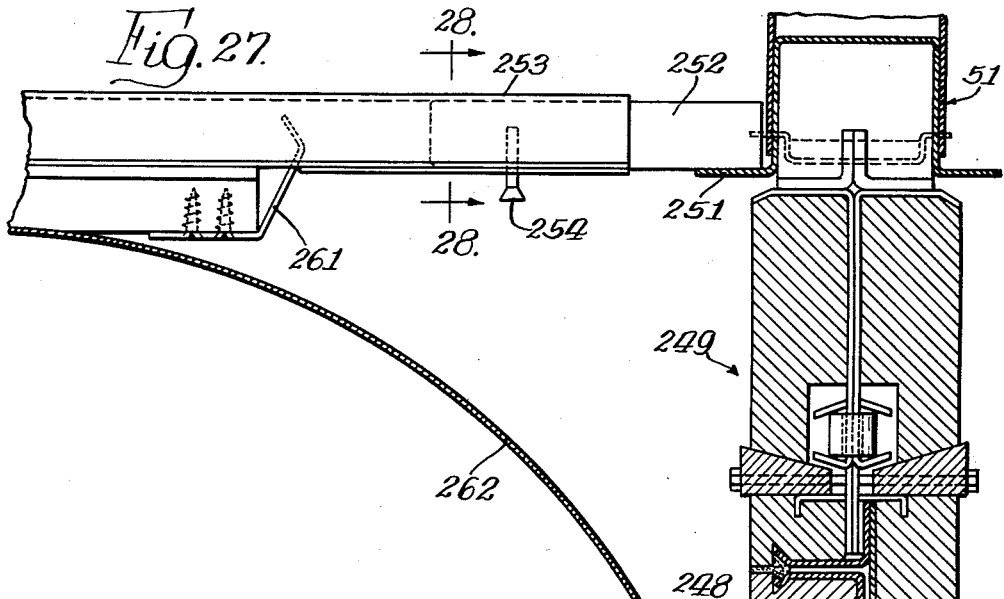
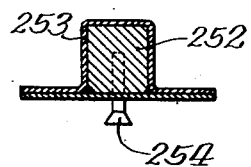
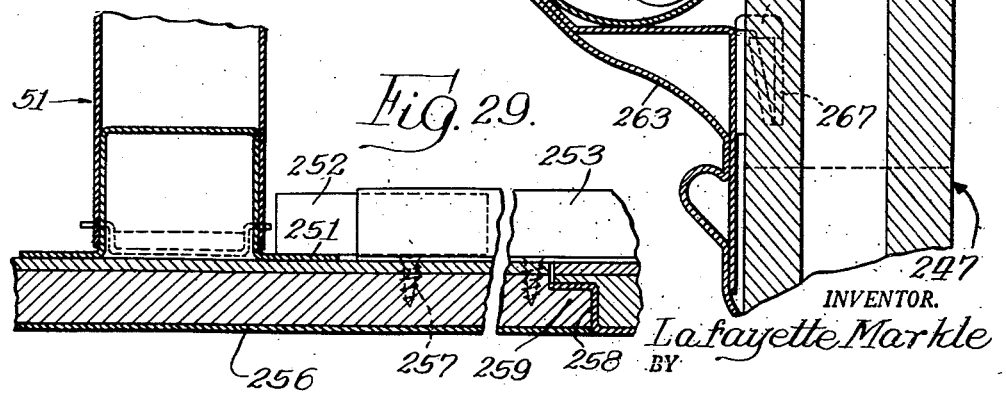

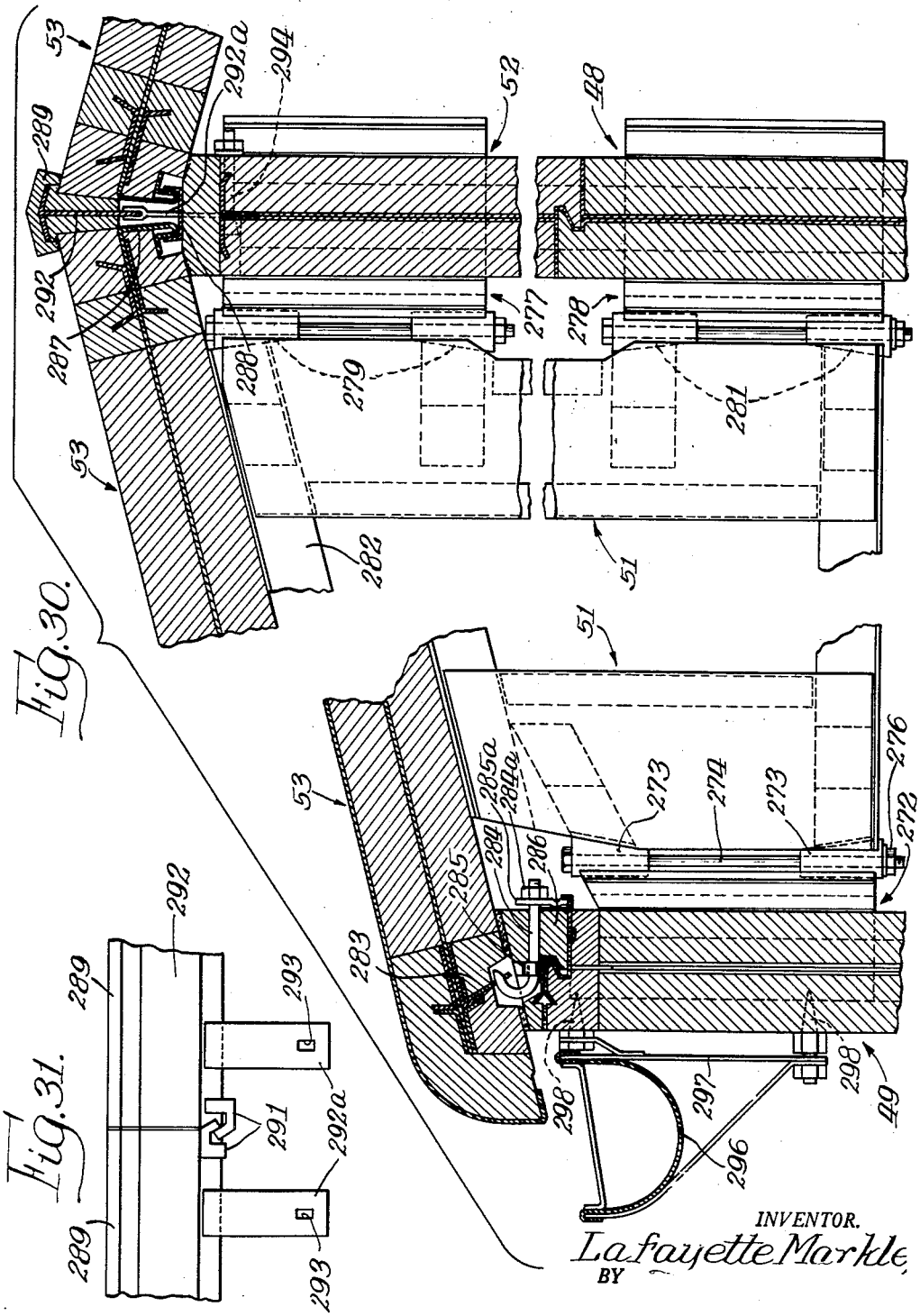

INVENTOR.
Lafayette Markle,
BY
Davis, Lindsey, Hibben - Noyes Atty's.

Aug. 30, 1960
L. MARKLE
2,950,786
BUILDING SYSTEM
Filed Jan. 27, 1954
16 Sheets-Sheet 14
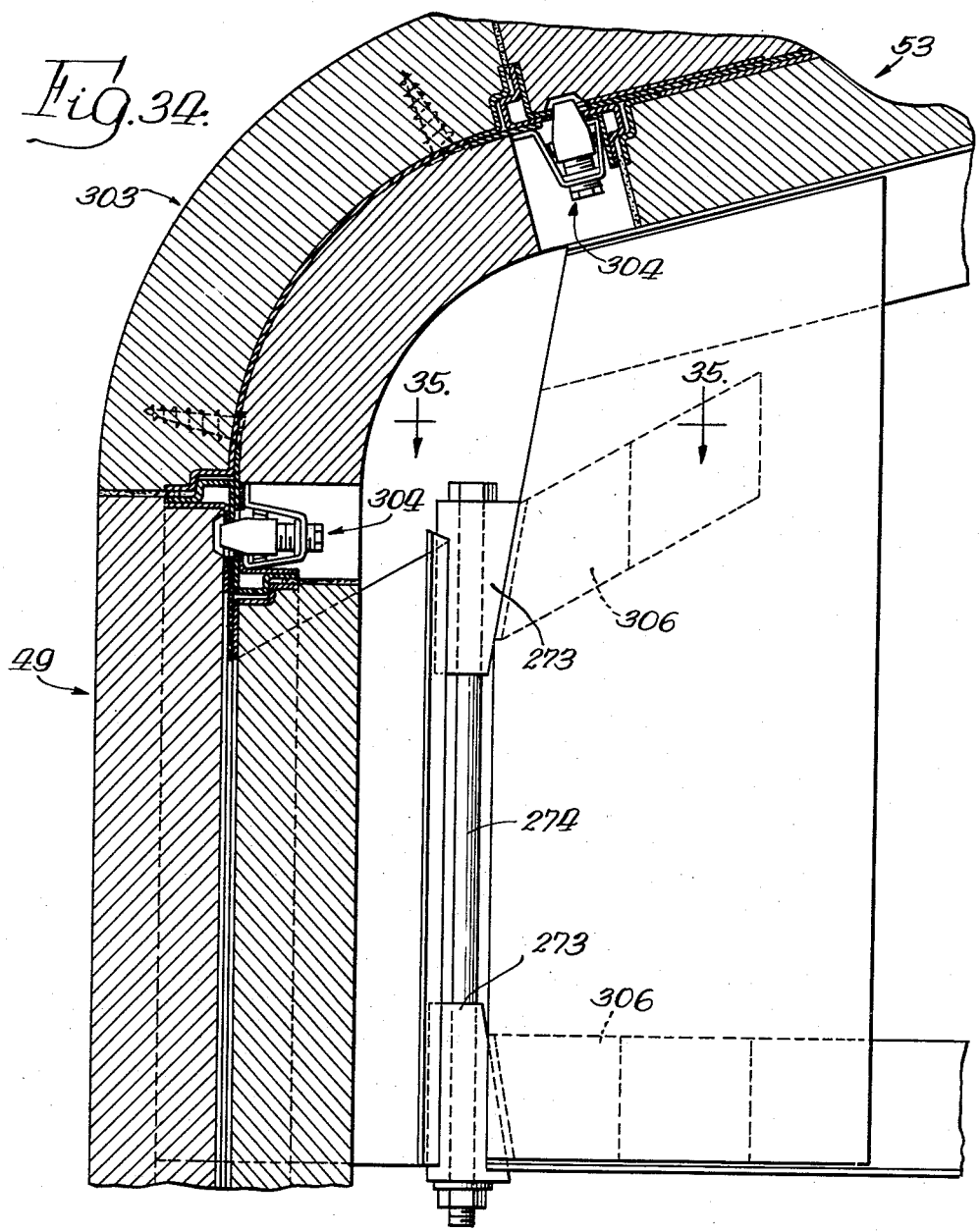
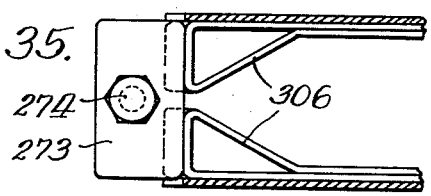
INVENTOR.
Lafayette Markle,
BY
Davis, Lindsey, Hibben, Noyes Attys.

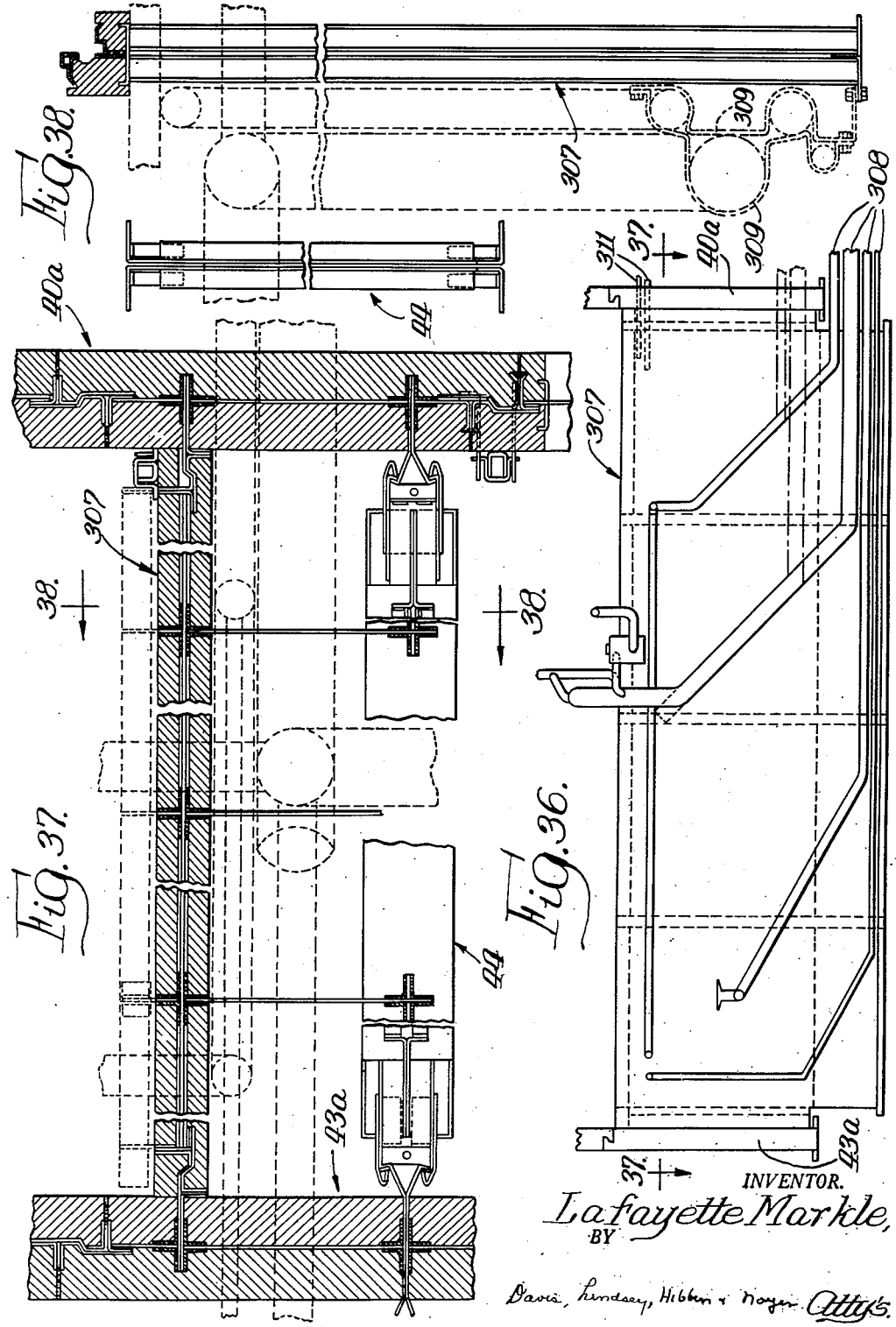

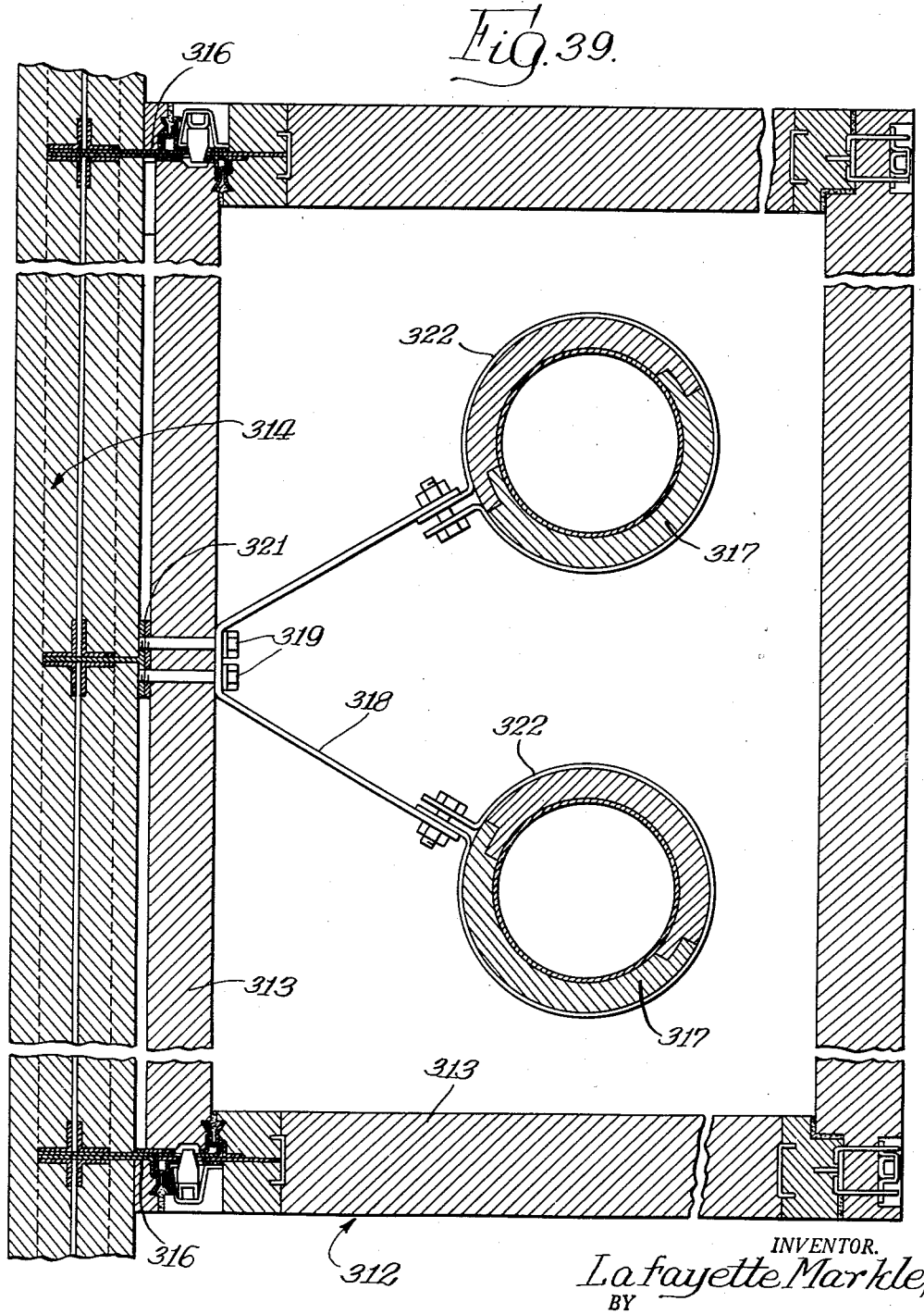

United States Patent Office 2,950,786
Patented Aug. 30, 1960

2,950,786

BUILDING SYSTEM

Lafayette Markle, Markle & Company, Barrington, Ill.

Filed Jan. 27, 1954, Ser. No. 406,413

42 Claims. (Cl. 189—1)

This invention relates to a novel building system for the fabrication and erection of dwellings and other buildings. More particularly, the invention pertains to a novel prefabricated building structure in which the various component parts are manufactured and sub-assembled in the factory or shop and are capable of rapid erection in the field with a minimum of labor and expense.

Numerous building schemes have been proposed for so-called prefabricated or partially prefabricated constructions. However, only relatively few of these schemes have achieved even limited commercial success. In many cases, the labor cost involved in the erection of the building has been excessive. In other cases, the inherent nature of the construction has been such that only restricted types of structural materials could be used. Another serious objection to such prior schemes has been their limited architectural flexibility such that only relatively few, if any, variations in style, size, and arrangement were possible. Moreover, none of the previously suggested systems has been properly adapted for manufacture of the component parts by modern high-speed techniques so as to be capable of profitable exploitation on a volume market basis.

Accordingly, a primary object of the invention is to provide a novel and improved prefabricated building system which overcomes the objectionable features and disadvantages of such schemes as heretofore known.

A further object of the invention is to provide a novel prefabricated building construction which is adapted for manufacture in quantity by modern assembly line methods but at the same time affords a wide choice in architectural treatment, size, and price class.

Another object of the invention is to provide a novel building structure capable of being erected at low labor cost from light weight shop-made component parts.

An additional objection of the invention is to provide a novel type of building construction formed from interconnected prefabricated unit parts which is characterized by a high degree of structural rigidity and resistance to external shock and distorting forces.

Still another object of the invention is to provide a novel completely integrated building system formed from a plurality of unit parts rigidly interconnected by novel wedge locking arrangements.

A still further object of the invention is to provide in a prefabricated building system a novel type of unitary panel construction capable of use in forming walls, partitions, floors, ceilings, roofs, and the like.

Other objects and advantages of the invention will become evident from the subsequent detailed description taken in conjunction with the accompanying drawings, wherein:

Fig. 1 is a perspective view of a building comprising one specific embodiment of the invention with portions of the structure broken away to reveal various novel features of the construction;

Fig. 2 is a fragmentary elevational view on an enlarged scale of a corner portion of one of the panel components of the building in Fig. 1 with the outer covering broken away to show the underlying arrangement;

Fig. 3 is a fragmentary horizontal cross-sectional view taken along the line 3—3 of Fig. 1 on an enlarged scale and showing one embodiment of the joint means for connecting a pair of adjacent vertical wall panels;

Fig. 4 is an elevational view of the joint means of Fig. 3 as seen from the inner side of the panels;

Fig. 5 is a vertical sectional view taken along the line 5—5 of Fig. 3;

Fig. 6 is a fragmentary perspective view of the corner portions of two panels of the type shown in Fig. 3 in exploded or detached relation and with the covering removed from the panels to show the basic frame structure;

Fig. 7 is a view similar to Fig. 3 but showing the panels in partially connected relation just prior to the locked position of Fig. 3;

Fig. 8 is a fragmentary sectional view taken along the line 8—8 of Fig. 7;

Fig. 9 is a cross-sectional view generally similar to Fig. 3 but showing a slightly different modification of the panel joint means and the panel frame construction;

Fig. 10 is a fragmentary perspective view of the frame portion of one of the horizontal eaves panels seen in Fig. 1;

Fig. 11 is a fragmentary cross-sectional view generally similar to Fig. 3 but showing still another embodiment of the panel frame construction and joint means;

Fig. 12 is an elevational view of the joint means of Fig. 11 as seen from the inner side of the panels;

Fig. 13 is a vertical sectional view taken along the line 13—13 of Fig. 11;

Fig. 14 is a fragmentary horizontal sectional view of the same panel joint shown in Fig. 11 but illustrating a modification of the locking means;

Fig. 15 is a fragmentary cross-sectional view of substantially the same type of panel joint shown in Fig. 11 but illustrating still another modification of the locking means;

Fig. 16 is a fragmentary cross-sectional view showing still another embodiment of a panel joint and locking means;

Fig. 17 is a fragmentary view showing another position of the locking means illustrated in Fig. 16;

Fig. 20 is an enlarged vertical sectional view as taken along the line 20—20 of Fig. 1 and showing a horizontal base panel with attached footing and beam hangers;

Fig. 21 is a fragmentary perspective view of the frame structure of a horizontal base panel, the covering of the frame being removed;

Fig. 22 is a view generally similar to Fig. 19 but showing a modified form of connection between a horizontal base panel and a mid-wall or partition;

Fig. 23 is a fragmentary horizontal cross-sectional view as seen substantially along the line 23—23 in Fig. 1 and showing one means of connecting the lower beams to the mid-wall or partition;

Fig. 24 is a fragmentary horizontal cross-sectional view showing another means of connecting a lower beam to a mid-wall or partition;

Fig. 25 is an enlarged fragmentary horizontal cross-sectional view as seen substantially along the line 25—25 of Fig. 1 and showing one type of interconnection between a vertical wall panel and an interior partition and also showing the mounting of a window frame in a wall panel;

Fig. 26 is a transverse sectional view as taken substantially along the line 26—26 of Fig. 25;

Fig. 27 is a fragmentary vertical sectional view at a corner joint between a vertical inside wall of the building and the ceiling and showing one type of cove construction and ceiling panel;

Fig. 28 is a transverse sectional view as taken along the line 28—28 of Fig. 27 and showing a detail of construction;

Fig. 29 is a fragmentary vertical sectional view showing another portion of the ceiling panel and its attachment to the upper beams of the building;

Fig. 30 is a broken vertical cross-sectional view on an enlarged scale as taken substantially along the line 30—30 of Fig. 1 and showing one type of connection between the eaves and roof panels and also one type of ridge cap construction for the roof;

Fig. 31 is a fragmentary side elevational view of the ridge cap strip illustrated in Fig. 30;

Fig. 34 is an enlarged fragmentary vertical sectional view showing still another modification of the eaves panel and roof panel joint;

Fig. 35 is a horizontal sectional view as taken along the line 35—35 of Fig. 34;

Fig. 36 is a side elevational view on a reduced scale of a special underground panel arrangement for mounting service and utility lines;

Fig. 37 is a broken horizontal sectional view on an enlarged scale of the service panel arrangement shown in Fig. 36 and taken substantially on the line 37—37 of Fig. 36;

Fig. 38 is a vertical cross-sectional view as taken along the line 38—38 of Fig. 37; and Fig. 39 is an enlarged fragmentary horizontal cross-sectional view as taken substantially along the line 39—39 of Fig. 32 and showing the details of one form of chimney construction.

Figure 19:
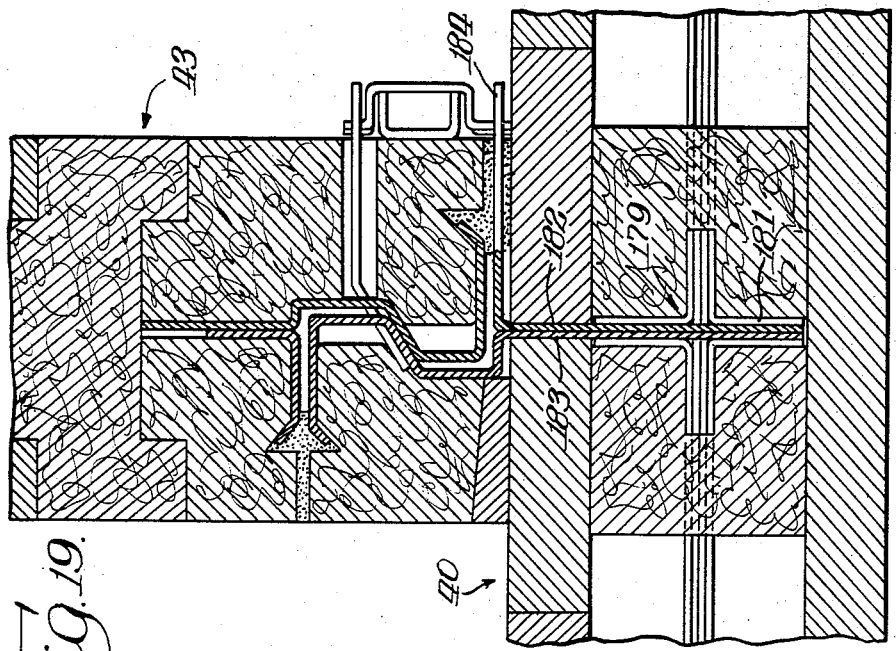
Fig. 19 is an enlarged fragmentary horizontal cross-sectional view as taken along the line 19—19 of Fig. 1 and showing one type of joint between a horizontal base panel and a mid-wall or partition.

One of the most important features of my invention involves a novel arrangement of preformed panel units interconnected by beams and cross walls to provide a rigid base structure or foundation for the building which can be easily erected in the field without the necessity of a separately built concrete slab or the like as has been customary in other prefabricated building schemes. As will hereinafter appear in greater detail, this foundation comprises a plurality of preformed base units in the form of horizontally extending panels interlocked in end-to-end relation to provide a base perimeter for the building. These base panels preferably have integral footings adapted to be received in a simple field-prepared trench. The same base panels are used to form cross wall supports in the base perimeter, and the base panels at opposite sides of the building are rigidly interconnected at predetermined intervals by cantilever-like beams so as to provide a rigid grid-like platform upon which the superstructure of the building is erected. Suitable floor panels are supported on the grid-like platform.

The outer walls of the building, and also the cross walls or partitions, are formed by vertically extending panel units having the same general structural characteristics as the base panels and interlocked at their lower ends with the upper edges of the base panels. At the upper ends of the vertical wall panels I provide another rigid grid-like platform composed of horizontally extending eaves panels interconnected to form an upper perimeter with cantilever-like beams extending between opposite sides thereof. This upper grid-like platform is interlocked at its bottom edges with the upper ends of the vertical wall panels and, in the case of a single story building, suitable roof panels are connected to the upper edges of the upper grid-like platform. Preferably, the end joints between the horizontal base panels and also between the horizontal eaves panels are staggered relative to the side joints between the vertical wall panels so as to increase the overall strength of the structure.

Thus, the entire framework of the building including base structure, superstructure, and roof structure constitutes an exceptionally sturdy self-contained unit independent of outside conditions and having excellent resistance to shock or other external distorting forces. In the case of a multi-story building, a generally similar rigid grid-like platform is interposed between the respective stories.

As also explained in detail hereinafter, another very important feature of the invention resides in the basic panel construction which is followed with appropriate modifications in the case of base panels, eaves panels, wall panels, roof panels, and floor panels. In each case the panel is a preformed light-weight unit of predetermined modular size comprising basically a metal frame or perimeter with cross members, purlins, or girts as required, cover strips enclosing the frame and forming beds at opposite sides of the panel, and panel covers press-fitted into the beds. Upon this basic panel core, any desired supplementary covering for decorative or protective purposes can be applied. In addition, the metal frame constituting the panel perimeter is of special interlocking edge design so that adjacent panels can be securely joined at their edges to form an integral wall structure. In general, the interlock is of a butt and lap type so that the panels can be joined by simple wedge lock arrangements thereby greatly facilitating rapid and inexpensive assembly in the field.

Referring first to Fig. 1, a general overall view of a typical one-story building is shown with portions broken away to reveal various structural relationships between the component parts. The base structure or foundation of the building consists of a plurality of elongated horizontally-extending base panel units 40 interconnected in end-to-end relation, as described in detail below, to provide a base perimeter. Each base panel 40 has an attached footing 41 of cementitious material or the like which is received in a suitable prepared trench (not shown) so that the usual concrete slab, wall, or piles are not needed. As seen in Fig. 1, the base panels 40 are substantially completely received within the trench, the ground level being indicated at 42. Of course, the base perimeter of the building is divided into sections by other cross panels, such as indicated at 43, which provide suitable support for upper mid-walls and partitions, as will be seen hereinafter.

For rigidity interconnecting and bracing the base perimeter formed from the base panels 40, I provide a plurality of horizontal beams 44 which extend between the base panels 40 at the front of the house and the mid-wall base panels 43. A similar set of beams (not shown) extends between the base panels 40 at the rear of the building and the mid-wall base panels 43. The beams 44 may be of any suitable type, but an open truss type beam composed of flanged channel chords, channel web members and special end plates is shown herein by way of illustration. The panels 40 and 43 have special hanger elements or yokes adapted to be rigidly interlocked with special fittings at the ends of the beams 44, as also described in detail below, so that the entire base structure or foundation is connected together to form a rigid grid-like platform with the opposite walls of the base perimeter being held securely in perpendicular position.

The superstructure of the building shown in Fig. 1 comprises a plurality of vertical wall panel units, indicated generally at 47, which constitute the outside walls of the building. Similar vertical panel units are employed for the mid-walls or partitions, as at 48. These wall panels 47 and 48 have a sealed interlocked connection with each other along their vertical side edges and also at their lower ends with the upper horizontal edges of the base panels 40 and 43.

An upper rigid grid-like platform is provided at the upper portion of the building and comprises a plurality of elongated horizontal belt or eaves panel 49 connected to form, in this instance, an eaves perimeter similar to the aforementioned base perimeter. Truss type beams 51 extend rigidly from the front and rear eaves panels 49 to the center mid-wall, as at 52, but in this case the beams 51 are slanted or tapered along their upper channel web members so as to provide suitably inclined supports for a plurality of elongated roof panel units 53. As will be seen below, the eaves panels 49 are rigidly interlocked with the upper ends of the wall panels 47 and also with the roof panels 53. In the case of a two-story building, the beams 51 would be similar to the beams 44 so as to define with the belt panel units 49 an intermediate rigid grid-like platform between the upper and lower stories of the building. Of course, an uppermost rigid grid-like platform composed of eaves panels 49 and beams 51 would be provided at the roof portion of the second story. It will also be understood that the same general structural arrangement is likewise applied when it is desired to provide a basement in the building.

Generally speaking, the same basic panel construction is used for the various panel units 40, 47, 49, 53, and the like with such variations as may be necessary in certain instances. For example, the base panels 40 each have the attached footing 41 at their lower edges and are equipped with hangers for attaching the beams 44. The eaves panels 49 likewise have hangers for the beams 51. Certain of the wall panels 47 have special provision for the mounting of door frames or window frames. Also, certain of the panels 40, 47, and 49 have special means at one end for defining a corner joint as will be seen hereinafter. In each case, however, the basic core panel structure is substantially the same and the means for interlocking or joining the edges of two adjacent panels of any type is similar in all cases whether the joint be between two base panels 40, between two wall panels 47, between two eaves panels 49, between a base panel 40 and a wall panel 47, or between an eaves panel 49 and a wall panel 47. In addition, the basic core panel structure is such that any desired supplemental covering may be applied to obtain a desired decorative or architectural effect, e.g. the outer clap-board covering 54 affixed to the wall panels 47. Obviously, other supplemental covering such as siding, tile, shingle, stone, etc. may also be used.

Referring next to Figs. 2 to 8, one embodiment of the basic panel structure which constitutes one of the important features of my system will now be described. Each panel unit, whether it be a base panel, wall panel, eaves panel or the like, comprises an internal rigid metal frame or perimeter (usually rectangular) having predetermined modular dimensions. The metal frame is formed from elongated members of angular cross-section having a special configuration so as to provide a peripheral edge around each panel unit having complementary projecting and recessed portions adapted to be interlocked with the corresponding peripheral edge portions of an adjacent panel member. Moreover, cover strips of a suitable material are bonded to the angle members for enclosing and protecting the same and for providing flat beds at opposite sides of the frame into which are fitted panel cover members of suitable material for enclosing the entire panel unit.

Figs. 3 to 8 illustrate the details of one type of panel unit construction and the method of interlocking the panels. In this instance, the structure is shown in connection with a pair of vertical wall panel units 47, but it will be understood that the same principles are utilized with obvious minor modifications throughout the rest of the building structure. The rectangular metal frame or perimeter of each panel unit 47 is indicated generally at 56 and is best seen in Fig. 6. Each side of the rectangular metal frame 56 has a predetermined angular cross-sectional configuration so that the edges of adjacent panel units can be readily interlocked. Thus, the frame 56 includes a reversely bent angle element 57 having an angular or inclined camming portion 58 and a laterally extending end flange portion 59. Welded to the angle element 57 is another angle element 61 having a lateral flange portion 62 extending generally perpendicularly to the angle element 57 and oppositely from the flange portion 59. As seen in Fig. 6, a triangular gusset plate 63 is welded to the angle members at the corner junctions thereof for stiffening the frame 56. The joint at each corner of the frame 56 is formed by a special channel shaped corner piece 64 which is welded to one of the angle elements 57 and extends longitudinally therefrom to provide the corner pocket for the corresponding corner portion of the adjoining panel frame. A pair of integral tabs or flanges 66 extend upwardly from the corner piece 64 and are welded to the other angle element 57 forming the corner of the frame. In addition, an angular brace 67 is rigidly secured, as by welding, to the ends of the frame members for reinforcing the corner construction. Thus, the corner connections define with the side members of each frame a continuous rigid peripheral band for the panel unit. As will also be clearly seen in Fig. 6, the angle elements 57 constitute projecting edge portions on the panel frames and the angle elements 61 comprise cooperating recessed edge portions, the projecting portion on one panel unit being adapted to be received in interlocked relation within the recessed portion of an adjacent panel unit so that the panels can be interfitted to form a unitary wall structure. As will appear below, the angle element 57 on coacting panel units thus provide a pair of overlapping and interfitting faces and each such lapping face has a pair of stepped portions located in parallel planes and integrally interconnected by the angular cam portion 58.

As will be seen in Fig. 8, the rectangular frame or perimeter 56 is also provided at intervals with cross members or struts 68 extending rigidly between opposite sides of the frame and secured thereto by U-shaped flanged members 69 which are fitted over the opposite side edges of the strut 68 and welded to the sides of the frame.

As best seen in Figs. 3 and 7, the panel frame or perimeter 56 formed from the metal angles 57 and 61 is substantially entirely enclosed or covered by means of elongated cover strips 71 and 72 disposed in opposed relation at opposite sides of the frame members. Thus, the cover strip 71 fits snugly within the angular configuration of the frame element 57, and the outer flange portion 59 has an inwardly turned end 73 which is received within a recess or groove 74 in the cover strip 71. Similarly, the opposed cover strip 72 fits snugly within the angular configuration of the frame element 61 and the outer end of the flange portion 62 is likewise turned inwardly, as at 76, and is received within a groove or pocket 77 in the cover strip 72. These cover strips 71 and 72 are held in clamped relation at opposite sides of the frame by means of a generally U-shaped clamping or straddle block 78 having leg portions 79 received within recesses or shoulder portions 81 and 82 in the cover strips 71 and 72, respectively, for frictionally retaining the cover strips in enclosing or sheathing relation on the metal frame. Consequently, it will be seen that the metal frame 56 with the cover strips 71 and 72 attached has a generally L-shaped cross-sectional configuration with one leg of the L (57—71) extending generally parallel to the plane of the panel unit to provide a projecting edge and the other leg of the L (61—72) extending generally perpendicularly to the plane of the panel unit to form a recessed panel edge. The projecting leg 57—71 of the panel edge may also be referred to as the lapping edge of the panel since it overlaps or overlies the corresponding edge portion of the adjacent panel unit. The angular cam portion or spline 58 is located in this lapping edge of each panel frame and is preferably disposed substantially at the center thereof in order to equalize the load distribution.

Although the cover strips 71 and 72 and the clamping blocks 78 may be made of any suitable material of construction, I generally prefer to employ a cementitious fibrous composition forming a rigid insulating and fireproof body around the metal frame members. However, wood or other suitable structural material may also be employed at this point. The inner faces of the clamping blocks 78 at the inner periphery of the rectangular frame 56 provide a pair of beds at the opposite sides of the panel unit into which are fitted a pair of rigid slabs or panel covers 83 so as to enclose the panel unit, these cover members 83 being disposed in parallel spaced relation at opposite sides of the panel unit. This basic core panel construction may be finished on either or both sides by any suitable exterior covering material such as the sheets or outer panels 84 which may be added in the factory or may be applied in the field. The supplemental covering 84 may consist of any suitable material adapted to provide a desired architectural or decorative appearance dependent upon the location of the panel in the building structure and whether the surface is an exterior or an interior one.

It is one of the important advantages of my invention that the choice of material for all panel constructions is entirely flexible so as to conform to market conditions, architectural preferences, and required structural properties. In most cases, I will prefer to employ a compound or multi-layer material for the panel covering. For example, the basic slab may be a fibrous cementitious composition of low density and high compressive strength to which an asphalt membrane is bonded as a moistureproof barrier and an outermost sheet of plywood, composition board, metal sheeting, or the like is bonded as an outermost finish surface. Moreover, the cover strips 71 and 72 for the frame members may be made of the same multi-layer slab material by suitable forming the same to conform to the shape of the angular frame members. I prefer to employ a sealing compound in bonding the cover strips 71 and 72 to the metal frame members to insure a moisture tight bond therebetween.

Another important feature of the panel construction utilized in my invention is the fact that the cover slabs or panels 83 are tightly press fitted into the beds formed by the covered frame at opposite sides of the panel unit. Again, an edge sealing compound is preferably used on the panels 83 to insure a moisture proof bond. As the panel members 83 are forced into position at opposite sides of the panel unit, it will be seen that the panel covers 83 are thereby placed in compression and the surrounding frame is placed in tension so as to result in a structurally strong and rigid panel unit having excellent dimensional stability. By reason of the spaced relation of the panel covers 83 at opposite sides of the panel unit, it will be seen that an air space is thereby provided between the double wall construction which imparts excellent insulating properties to the panel unit.

Figs. 3 and 7 illustrate the manner in which the interlocking edges of adjacent panel units are joined together in locked relation. In Fig. 7, the panel units are shown in the process of being interfitted at their peripheral edge portions with the projecting edge of each panel about to enter the pocket or recess provided by the complementary projecting edge of the opposite panel and with the projecting edge portion of each panel about to abut against the recessed edge portion of the opposite panel. The recessed edge portion of each panel unit preferably has affixed thereto in the shop a layer of gasket or caulking material 86, this material being resiliently compressible for providing a tight sealed connection when the panels are completely locked. The gasket material 86 may conveniently comprise a rubber composition or any other suitable compressible sealing compound. Of course, the gasket or sealing material may also be applied in the field if desired. The rigid metal peripheral frame of each panel unit provides important protection for the panels so that they can be handled without being easily damaged. Also, the location of the gasket 86 on the recessed edge portion of the panel unit serves to protect the gasket from damage during handling of the panels.

After the edge portions of the panel units are interfitted, the panels are drawn toward each other in tight locked engagement by means of a wedge locking arrangement which will now be described. The edge of the left-hand panel unit as seen in Figs. 3 and 7 is provided with a pair of laterally extending side plates which project outwardly through openings in the cover strips and outermost panel covering to form a wedge receiving pocket. Thus, a plate 87 is welded to the bent end portion 76 of the angle element 61 and extends outwardly from the panel unit through the cover strip 72 and the outer covering 84. Another side plate 88 is welded to the angular portion 58 of the angle element 57 and extends outwardly in parallel spaced relation to the side plate 87 through a slot 89 in the angle element 57 of the opposite panel member and an opening 91 in the cover strip 71. An elongated pocket or recess 92 is formed in the outer cover member 84 and the plates 87 and 88 extend into this recess when the panel units are fitted together. A U-shaped wedge plate or reaction member 93 is operatively connected between the projecting ends of the side plates 87 and 88 by means of side flanges 94 projecting from the wedge plate into suitable slots 96 in the respective side plates 87 and 88. The flange portions 94 of the wedge plate preferably have raised rib portions 97 for stiffening and strengthening purposes.

After the edges of the panels have been joined in this preliminary fashion and the wedge plate 93 interfitted with the side plates 87 and 88 which define the wedge receiving pocket, an elongated tapered wedge member 98 of generally U-shaped or channel-shaped cross-section is driven vertically downwardly into the pocket defined between the wedge plate 93 and the outer surface of the adjacent panel unit. As will be readily understood from Fig. 3, the driving of the wedge member 98 causes the right-hand panel unit to be forced in one direction while the reaction imparted through the side plates 87 and 88 causes the left-hand panel unit to be drawn laterally in the opposite direction, i.e. the panel units tend to be drawn laterally toward each other. However, the inclined cam surface 58 on each of the angle elements 57 in the peripheral edge portions of the coacting frames are thereby shifted relative to each other with the result that the respective panel units are drawn tightly against each other in edgewise or endwise relation and thereby compressing the gasket material 86 between the respective recessed and projecting edge portions of the panel units. In Fig. 3, the structure is shown in completely wedge locked position and it will be seen that the gasket material 86 is tightly compressed and extends over a substantial area of the contacting edge portions so as to provide the desired tight sealing relation.

Fig. 9 shows a slight modification of the panel frame construction hereinbefore described, the differences being best seen by comparison of Fig. 9 with Fig. 3. As evident from Fig. 9, the rectangular frame or perimeter is again formed from metal angles welded together to provide a peripheral edge having a projecting portion and a recessed portion. In this case, the angle element constituting the projecting edge portion of the frame is designated at 99 and comprises an elongated leg 101 with an angular bend or cam portion 102 and a perpendicularly extending leg 103 having an inwardly turned end portion 104. The cooperating angle element constituting the frame member is a simple angle element 106 having a leg portion 107 welded to the leg portion 101 of its companion angle element 99 and also an outwardly extending leg portion 108. The angle elements constituting the frame members are again covered by suitable elongated cover strips, designated at 109 and 110, the strips being retained in enclosing relation on the frame by means of elongated straddle plates or clips 111 having side flanges 112 extending into suitable slots in the cover strips 109 and 110. The core panel cover members, indicated at 113, are press-fitted into the beds formed at opposite sides of the panel unit by the peripheral cover strips 109 and 110, the peripheral frame thereby being placed in tension and the cover panels 113 being placed in compression in the same manner as hereinbefore described. Supplemental outer cover panels 114 are also applied.

In the Fig. 9 embodiment, the same general type of wedge locking means is employed for securing adjacent panel units in tightly locked relation. Thus, the wedge receiving pocket is formed from a pair of laterally extending side plates 116 and 117 which are welded to the portions 108 and 103, respectively, on the angle elements of one panel unit and project outwardly from the panel unit into a recess or pocket 118 in the outer panel covering 114. A wedge plate 119 is also provided and cooperates with the side plates 116 and 117 in the same manner as the wedge plate 93 illustrated in Fig. 3. An elongated channel-shaped wedge element 121 is driven vertically between the wedge plate 119 and the panel for forcing the panel units laterally or transversely toward each other. By this wedging action, the inclined cam portions 102 on the respective frame members coact to cam the panel units together in edgewise locked relation in substantially the same manner as hereinbefore described. In this case also a sealing gasket material 122 is interposed between the butting edge portions of the respective panel units for insuring tight sealed engagement. It will be seen that in the Fig. 9 arrangement the projecting leg portion or lapping edge of the panel is of substantially increased width as compared with the Fig. 3 embodiment but the cam or spline portion 102 is still located approximately in the middle of the projecting edge. In addition, the plate 117 forming one side of the wedge-receiving pocket is fastened to the straight leg portion 103 of the angle element 99 rather than to the inclined cam portion thereof as in the Fig. 3 embodiment. Thus, a wider wedge pocket and wedge element are possible and the increased spacing between the points of application of force to the panel units contributes materially to the strength of the joint and the resistance of the interconnected panel units to lateral stresses.

The panel construction illustrated in Fig. 9, although of the same basic interlocking type, is somewhat simpler in that the angle elements 99 do not have the double reverse bend configuration shown in Fig. 3. However, as a result of this simpler construction, the junctures between the respective connected angle elements 99 and 106 in each panel frame are disposed at opposite sides of the center line of the panel units, whereas in the Fig. 3 embodiment the angle elements 57 and 61 are joined along a single plane which is substantially coincident with the center line of the respective panel units. It will be understood that under certain circumstances the centered construction of Fig. 3 will be preferable from the point of view of maximum structural strength.

In Figs. 11 to 13, I have illustrated still another type of panel frame construction which is adapted to be wedge locked in a slightly different manner. In this case, the frame members are formed from a pair of angle elements of slightly different configuration. One angle element, indicated at 123, provides a projecting peripheral edge portion on the frame and consists of an elongated leg 124 and an angularly extending leg 126 having an offset spline or bulging portion 127. A reinforcing angle 128 is welded in the corner of the angle element 123 and has a leg portion 129 welded to the leg portion 124 and a leg portion 130 secured to the leg portion 126. The cooperating angle element of the frame member is designated generally at 131 and comprises a leg portion 132 welded to the leg portion 124 and an angularly extending leg portion 133 having an outward bulge or off-set portion 134. As will be evident from Fig. 11, when adjacent panel units are in interlocked relation, the bulged portions 127 in the angle elements 123 are received in seated relation within the grooves or pockets provided in the angle elements 131 by the off-set portions 134. This double spline and groove arrangement in the joined panel units provides a high degree of resistance to lateral or transverse stresses.

In the Fig. 11 embodiment, the metal frame or perimeter is enclosed by elongated covering strips designated at 136 and 137, these cover strips being retained by straddle clips 138 of the same general type as the clips 111 shown in Fig. 9. Also, a pair of basic core panel covers 139 are press fitted into the beds provided by the peripheral cover strips 136 and 137 in the same general relationship with the frame as hereinbefore described. In this instance, a supplemental outer covering comprising laminated layers 141 and 142 is shown at one side of the panel unit and a supplemental covering 143 is shown at the opposite side of the panel units.

The wedge locking arrangement in this case comprises a tubular wedge housing 144 which is welded into the corner portion of the reinforcing angle element 128 in one of the frame members. This housing 144 extends outwardly and access thereto is provided through an opening or a recess 146 provided in the outer covering 143. An elongated vertical cam block 147 having a tapered inner longitudinal edge or nose portion 148 is loosely mounted for transverse sliding movement within the housing 144 by means of a pair of elongated fingers 149 secured to the wedge housing 144 and having inwardly turned bottom end portions 151 which seat loosely in a pair of transverse grooves 152 in the wedge block 147. The tapered nose portion 148 of the wedge block 147 extends through an elongated opening 153 provided in the superimposed frame portions 129 and 124 and also through a substantially registered or overlapping opening 154 in the corresponding frame portion of the opposite panel unit. The cover strip 136 is cut away, as at 156, to provide a recess for receiving the nose portion 148 of the wedge block 147. An elongated channel shaped wedge 157 is driven vertically into the space between the wedge housing 144 and the wedge block 147 for urging the latter inwardly of the panel units. In this manner, the tapered nose portion 148 of the wedge block engages the opposite vertical side edges of the openings 153 and 154 in the frame members thereby effectively camming the frames in opposite edgewise directions so as to bring the bulged portions 127 into tight fitting engagement in the complementary pockets provided in the abutting recessed frame portions. A sealing gasket material 158 is interposed between the abutting edges of the panel frames for providing the desired water tight sealed engagement. Here again, the cam lock means 147—153—154 is located substantially in the center of the projecting or overlapping panel edges.

In Fig. 14, a further modification of the Fig. 11 structure is shown in that a screw 159 is threaded into the front of the wedge housing 144 and coacts with the outer vertical edge of the wedge block 147 for urging the latter inwardly into camming engagement with the panel frames. In some instances, the screw means for actuating the wedge block may be preferred instead of the use of a tapered elongated wedge member 157 which must be driven vertically with a hammer or the like. Although I have illustrated the screw actuating means 159 in connection with only the Fig. 11 embodiment of the joint construction, I wish it to be understood that the screw means can also be employed in the Fig. 3 and Fig. 9 embodiments in place of the wedge elements 98 and 121, respectively. In such case, the actuating screw would be threaded into the wedge plate 93 or 119 and would bear against the adjacent panel unit, a wear plate or the like being provided on the panel at this point if desired.

Fig. 15 is a further modification of the locking means for a panel joint of the Fig. 11 type. In this case a two-piece wedge means actuated by a screw is employed to cam the panel units into locked relation. Thus, one wedge piece is designated at 160 and coacts with the edge of the opening 154. A complementary wedge piece 160a coacts with the edge of the panel frame opening 153, the two wedge pieces having mating angular faces, as at 160b. A screw 160c with a head portion 160d adapted to be manipulated by a socket wrench or other tool extends through an enlarged bore 160e in the wedge piece 160a and is threaded into the wedge piece 160. A thrust washer 160f is interposed between the enlarged screw head 160d and the outer wedge piece 160a so that by tightening the screw 160c the wedge pieces are drawn toward each other and the panel units are cammed together in tightly interlocked relation.

In Figs. 16 and 17 I show still another variation in the panel frame configuration and the locking means. In this case one of the angle elements of the panel frame is generally similar to the Fig. 3 form but has a pair of oppositely bent ribs 160g with coacting inclined cam faces 160h. The panels are forced laterally toward each other by means of a rotary plug 160i having a head portion 160j for turning the same. The locking plug 160i when in its Fig. 17 rotary position can be inserted axially through aligned openings 160k in the panel frames and then rotated 90° to its Fig. 16 position whereby a flange portion 160m and a tapered cam or wedge surface 160n coact at opposite sides of the panel frames to force the latter toward each other. This movement of the panels laterally toward each other is then transformed by the coacting cam surfaces 160h to an edgewise movement of the panels toward each other into tightly locked relation in the same general manner as hereinbefore described in connection with Fig. 3.

Also shown in Fig. 16, is a panel fastening element in the form of a barbed element or anchor 330 having a central fold 331 for mounting the same on the edge of one end of the angle elements forming the panel frame. The opposite ends of the element 330 are formed with split diverging ends 332 which are embedded in the panel covers, designated at 333, for holding the same in place and resisting any tendency of the panel covers to bulge outwardly under the compressive forces exerted on the panels when press fitted in place as heretofore described.

As previously mentioned, the basic panel construction with interlocking peripheral edges is employed throughout my building system with such modifications as may be necessary to meet the requirements at specific portions of the building structure. For example, in Fig. 10 I have illustrated a fragmentary portion of a panel frame such as would be utilized in one of the eaves or belt panel units 49. In this case the upper and lower peripheral edges of the panel frame are formed from angle elements 57 and 61 which are substantially the same as illustrated in Figs. 3 to 8 and are adapted to be interlocked with the roof panel units 53 and with the upper edges of the vertical wall panel units 47, respectively. However, in this case a central upright stud structure 161 extends rigidly between the upper and lower edges of the panel frame, this stud structure 161 comprising a plurality of nested angles 162 arranged to provide a star shaped cross-section. Opposite pairs of the angles 162 are rigidly secured at opposite sides of the upper and lower frame members by means of angular strips or braces 163 welded to the frame and to the stud angle elements 162. At the inner side of the frame constituting each belt panel unit 49, a yoke or beam hanger is secured in the form of a pair of plates 164 sandwiched between adjacent angles 162 and diverging outwardly to provide a Y-shaped yoke having outwardly bent flanges 166 at their outer ends. As will hereinafter appear, the flanged yoke construction constitutes a hanger for engaging the outer ends of the upper cross beams 51.

Figure 18:
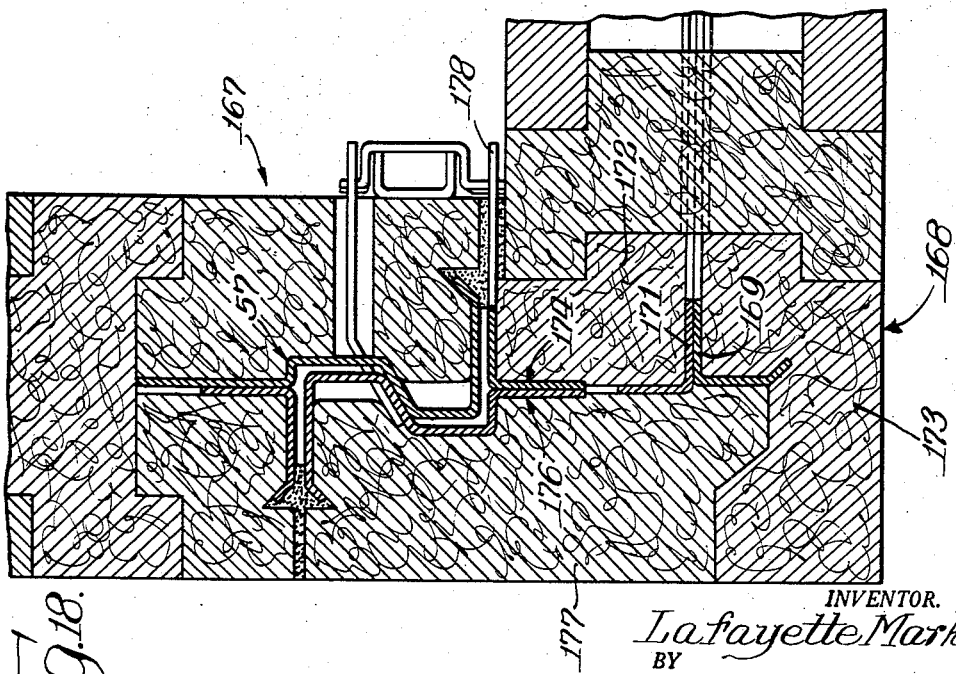
Fig. 18 is an enlarged fragmentary horizontal cross-sectional view as taken substantially along the line 18—18 of Fig. 1 and showing a corner joint between vertical wall panels.

In Figs. 18 and 19 I have illustrated other modifications of the basic panel construction as required for various specific purposes. Thus, in Fig. 18 I show a typical corner construction between vertical wall panel units 47. The panel units which are employed at a corner portion of the building structure have a special corner end construction for providing the corner joint. Although a right angle corner construction is shown in Fig. 18, this can be modified to provide any desired angular configuration, e.g. an obtuse angle such as required in a bay window. As seen in Fig. 18, the uppermost connecting panel unit is designated at 167 and the structure thereof is substantially identical with the peripheral edge construction shown in the right-hand panel unit of Fig. 3. However, the edge construction 168 of the bottom panel unit as seen in Fig. 18 is modified to provide a corner joint. Thus, the corner portion of the frame has a pair of diverging angle elements 169 and 171 which are welded together and covered by suitable cover strips 172 and 173, the latter cover strip extending beyond the edge of the panel to form the corner portion of the building. At the outer end of the angle element 171 another pair of diverging angle elements 174 and 176 are welded together and sandwiched between the inner cover strip 172 and an outermost cover strip 177 which interfits with the cover strip 173 as shown to complete the corner construction. The angle element 174 has a leg portion 178 which extends inwardly of the building to provide one of the side walls of the wedge pocket. The opposite angle element 176 is substantially identical with the angle element 57 in the coacting panel unit 167 and thus the wedge locked interconnection between the panel units 167 and 168 in accomplished in substantially the same manner as hereinbefore described in connection with Fig. 3. The method of assembly and other features of the corner construction in Fig. 18 will be obvious from the previous description of the panel joints and further description is not necessary at this point.

In Fig. 19 I show how one of the base panel units 40 is provided with upright stud structure 179 for connecting the base panel to a mid-wall base panel 43. The stud structure is similar to the stud structure 161 shown in Fig. 10 and comprises four nested angles 181 rigidly connected between the upper and lower edges of the panel frame and having sandwiched therebetween a pair of inwardly extending connecting angles 182 and 183. The connecting angle element 182 is similar to the element 174 in Fig. 18 and extends laterally to provide a side plate 184 for the wedge locking mechanism. The opposite connecting angle element 183 is substantially similar to the element 176 in Fig. 18 and coacts with the edge construction of the panel unit 43 in the same manner as illustrated in Fig. 18. A similar arrangement may also be used for connecting a beam to a wall.

In Figs. 20 and 21 I show further details of a base panel unit 40 and these figures will be decribed only insofar as the details differ from the description heretofore presented. The upper edge of the panel frame is identical with that shown for an eaves panel unit in Fig. 10 and comprises the connected angle elements 57 and 61. However, the lower edge of the base panel unit consists simply of a pair of opposed angles 186 welded together to provide a flat bottom surface which in the case of Fig. 21 is secured to a footing 187 of concrete or the like by means of bolts 187a. The central stud structure 179 is provided in this instance with a double set of upper and lower beam hangers 188 which are similar to the hangers shown in Fig. 10, each consisting of a pair of diverging plates 189 with laterally extending end flanges 191. As will appear hereinafter, these hangers 188 are adapted to engage the ends of the bottom cross beams 44. In Fig. 20 the base panel unit is shown with longitudinally extending struts in the form of U-shaped channels 192 for strengthening purposes. It will be understood that these struts are rigidly connected as by welding to the opposite end portions of the panel frame. In addition, in Fig. 20 the base flanges 186 at the bottom edge of the panel unit are welded to a base plate 193 and the entire bottom edge of the panel is surrounded by cover portions 194 and 196 for enclosing the base of the panel and providing an integral footing. These cover portions 194 and 196 may conveniently comprise a hard cementitious composition which can be preformed to the desired shape and secured in enclosing relation around the bottom edge of each base panel unit. With this built-in or integral footing arrangement, it is only necessary to provide a field prepared trench for receiving the base panel units and thereby dispensing with the necessity for pouring a concrete foundation slab as is usually required in most building constructions.

Fig. 25 illustrates among other things, the manner in which one of the vertical wall panel units 47 is modified to mount a window frame or door frame. The peripheral edge construction of the wall panel unit in Fig. 25 is the same type as that heretofore described in detail in connection with Fig. 3. However, the straddle blocks 79 have been omitted along the vertical side portions of the panel frame in order to accommodate a conventional window sash designated fragmentarily at 197. The details of this window construction form no part of the present invention and further discussion of this point is unnecessary. However, it may be pointed out that the angle elements 57 and 61 have been modified at their inner edges to receive the window casing designated at 198. Thus, the angle element 57 of the panel frame has rigidly secured thereto a special bracket 199 which is engaged by a retaining member 200, the latter being driven or wedged into a hook 201 fastened to the window casing 198. Obviously, a plurality of such fasteners 200—201 may be provided around the frame to receive the peripheral brackets 199. Also, a special mounting strip 202 is disposed in a groove 203 around the edges of the window casing 198 at the opposite side of the angle element 57 and is secured to the casing by means of angle brackets 204 and screws 206. By means of the coacting bracket and clip arrangement 199—200—201 at one side of the panel frame and the mounting strip 202 at the other side of the panel frame, it will be seen that the window casing is securely and rigidly mounted in the frame. Although not shown in the drawing, it will be evident from Fig. 1 that the wall panel unit containing the window construction is also provided with a horizontally extending mounting arrangement at the upper and lower edges of the window frame which may be similar to the arrangement shown in Fig. 25 for the vertical sides of the window frame. Because of the fact that the window structure is completely contained within and protected by the rigid peripheral frame of the panel unit, it is possible to make the window casing and framing of exceptionally light weight construction since the surrounding metal frame of the mounting panel receives all of the stresses and strains to which the building structure may be subjected. The vertical wall panel unit for mounting a door 207 (Fig. 1) may have a generally similar construction whereby the door frame is completely retained within and protected by the rigid metal frame of the panel unit.

Although I have described heretofore in detail several typical instances in which the basic panel unit construction is utilized in my building system, it is to be understood that these examples are given merely by way of illustration and not by way of limitation. The roof panels 53 as well as the ceiling and floor construction of the building may likewise have the same basic panel arrangement if desired. An important feature of the panel construction is the concept of forcing the facing panel cover members into opposite sides of the frame so as to put the frame in tension and the panels in compression. This arrangement greatly stiffens and strengthens the individual panel units so that when a plurality of panels are interlocked the resultant wall structure is substantially stronger than would be the case if the facing or cover panels were merely nailed or otherwise fastened to the frames. Generally speaking, the wedge locking arrangements heretofore illustrated will be located at the inside surfaces of the panel units, i.e. at the interior of the building. However, the opposite arrangement can be employed if desired in certain instances. The basic core panel construction herein described is also capable of a wide variety of supplemental uses incident to a building system. For example, instead of the rigid cover panels at opposite faces of a panel frame, I may weld to the frame sheets of metal lath or similar open mesh material, these sheets preferably being secured under tension to strengthen the overall unit. Then, concrete or the like may be applied over the latch at opposite sides of the frame so as to provide concrete surfaced panel units which may be interlocked in the manner heretofore described for constructing concrete floors or the like.

A further feature of the invention relating to the panel units is also seen in Fig. 1, namely, the fact that the modular size and arrangement of the horizontal panel units 40 and 49 relative to the vertical panel units 47 are such that the joints between the respective types of panels are staggered. In other words, the end joints between the horizontal panel series in both the upper and lower grid-like platforms are staggered with respect to the vertical side joints between the wall panels so as to strengthen the combined wall construction. Thus, individual wall panel units 47 are held together by the joint means at their adjacent vertical edges and at the same time a plurality of such panel units is locked together by upper and lower horizontal panels which overlie the end edges of the plurality of vertical wall panels.

Fig. 22 shows a modification of the connection between an outer vertical base panel unit 40 and a mid-wall or partition panel unit such as 43. In the Fig. 19 embodiment, the central stud structure 179 is located in line with the mid-wall. However, this may not always be the case and the Fig. 22 construction can be utilized when the mid-wall or partition does not happen to coincide with one of the vertical stud structures. In such case, a U-shaped yoke 208 is connected between a pair of stud structures 179, and the mid-wall panel, designated at 209, is connected to the bridge or yoke 208. The yoke 208 has a central depressed portion abutting against the base panel unit 40 and a pair of side leg portions 211 having inwardly turned reinforced hook members 212 welded thereto in spaced relation. These reinforced hooks 212 are adapted to engage a pair of diverging outwardly flanged hanger elements 213 extending rigidly from each of the upright stud structures 179. The parts are retained in locked engagement by means of vertically driven wedge elements 214 which are interposed between the leg portions 211 of the connecting yoke and the flanged ends of the hanger elements 213 so as to retain the latter in rigidly locked engagement with the reinforced hook elements 212. The central depressed portion of the mounting yoke 208 has a special angle element 216 mounted thereon to interconnect with the complementary peripheral edge portion of the mid-wall panel 209 in the same general manner as hereinbefore described. Thus, a mid-wall or partition 209 can be connected to an outer wall of the building at any particular desired point regardless of whether or not the mid-wall happens to coincide with a stud structure in the outer wall.

Fig. 23 illustrates the details of a wedge type connection between one of the mid-wall base panels 43 and a lower cross beam 44. However, the same type of connection may be used throughout the building structure for connecting the cross beams 44 and 51 to the appropriate panel units at the opposite ends of the beams. The mid-wall base panel 43 has a central vertical stud structure 217 from which a yoke type hanger projects rigidly on opposite sides of the panel unit. This beam hanger or yoke comprises a pair of diverging plates 218 having outwardly flanged end portions 219. The connecting end of the beam 44 has a pair of end extensions 221 at the vertical sides of the beam which are provided with inwardly turned hook portions 222, the hook portions 222 interfitting with the oppositely extending flanged portions 219 on the hangers. For reinforcing the hook ends 222 on the beam 44, I preferably provide a pair of elongated reinforcing plates 223 which extend along the sides of the beam and the end extensions 221 and are rigidly secured thereto as by welding. These reinforcing plates 223 have a sharp angular bend 224 at their outer ends which coacts with the hooks 222 to strengthen the same. The end of the beam 44 also has attached at its inner faces a pair of rigid abutments or thrust members 226 which are disposed in longitudinally spaced relation from the hook ends 222 of the beam. A tapered wedge block 227 is interposed vertically between the abutments 226 and the flanged hanger ends 219 for retaining the portions 219 and 222 in rigid locked engagement.

As will be seen hereinafter in connection with the upper cross beams 51, I preferably provide a pair of wedge blocks 227 disposed at the upper and lower ends of the hanger, the two wedge blocks being drawn toward each other in locking relation by means of a threaded screw or bolt 228. By means of this rigid locking relation between the ends of the cross beams and the hangers on the oppositely disposed panel units at the ends of the beam, I am able to insure maintenance of the opposite vertical walls in perpendicular position.

In order to strengthen or stiffen the mid-wall panel 43, I may interpose between the ends of the beams and the mid-wall panel 43 a pair of elongated vertical free studs 230. These studs 230 are formed from connected channels to provide a hollow member having any desired configuration to conform to the structure at the ends of the beams 44. Thus, the inner faces of the free studs 230 are inclined and bulged inwardly to fit closely against the reinforcing members 223—224. Although not shown in detail in the drawings, it is to be understood that the vertical free studs 230 will extend vertically along the mid-wall panel 43 from the lower cross beams 44 to a similar interfitting juncture at the upper cross beams 51 in the upper grid-like platform. The oppositely disposed free studs 230 are held in position by means of cross bolts 230a. Similar free stud arrangements may also be provided as needed along outer walls.

Fig. 24 illustrates another manner of connecting a base panel 43 to a cross beam 44. In this instance the cross beam 44 is provided with a special end portion designated generally at 235, and the base panel 43 has a stud structure 235a similar to the arrangements heretofore described but having connected thereto an attaching means 235b which interlocks with the special beam end portion 235. As will be apparent, the interlocking connections 235 and 235b have the same type of double lip and groove relation and the same wedge locking arrangement as heretofore described in connection with the panel joint of Figs. 11–13 so that further description is unnecessary.

Figs. 25 and 26 illustrate a method which may be used for joining a mid-wall or partition such as the panel 48 to an outer vertical wall panel 47. In many instances, the dimensions of the various panel units are such that an exact fit, as illustrated in Fig. 19, cannot be achieved. In the event that there is a gap or space at this juncture, I provide a compensating strip structure designated generally at 229 in Fig. 25. This compensating strip structure 229 comprises a pair of welded angles 231 having outwardly bent end portions 232 and a U-shaped vertical clip or hook 233 at one end thereof. The opposite ends of the angles 231 are flanged outwardly and tapered, as at 234. The angle members 231 thus constitute a connector between the panel units 47 and 48. Obviously, any desired number of these connectors may be employed at spaced points along the vertical junction between the panel units. The panel unit 47 is provided with a tapered pocket member 236 to receive the clip or hook end 233 of the connector, and the end edge of the panel unit 48 has a special interlocking member 237 designed to interfit with the panel edge in much the same manner as another panel unit would be joined thereto. This element 237 has a pair of upper and lower flanged yokes 238 extending rigidly therefrom toward the panel unit 47 above and below each of the angle connectors 231. A tapered vertical channel-shaped wedge member 239 is driven downwardly between the flanged hangers 238 and the flanged ends 234 of the connector so as to place the connector 231 under tension and hold the panel units 47 and 48 rigidly together. Suitable cover strips 241 are mounted on opposite sides of the connector units 231 for concealing the same, and the small space between the cover strips 241 and the adjacent edge of the panel unit 48 are filled by elongated vertical wedge-shaped filler strips 242 which are drawn together by a bolt 243 and nut 244 coacting between the filler strips 242.

It will be apparent that by varying the dimensions of the connectors 231 and the degree to which the wedge member 239 is driven into wedging relation, the parts can be adjusted for any particular gap at the juncture of the panel units 47 and 48 thereby compensating for practical dimensional variations and for different gasket thicknesses at panel joints. Although not always necessary, I may also interfit a pair of elongated vertical free studs 246 into the corner junction between the wall panel 47 and the compensating strip structure 229 for strengthening and stiffening purposes. These free studs 246 have a hollow construction formed from nested channels of predetermined shape to conform to the configuration of the compensating strip structure 229 in generally the same manner as hereinbefore described for the free studs 230 shown in Fig. 23.

Figs. 25 and 26 also illustrate the use of a wedge lock hanger arrangement for attaching supplemental outer covering to the wall panels. The basic core panel covering is indicated at 240 and the supplemental outer covering is in this case a laminated or multi-ply structure as seen at 240a, 240b, and 240c. A channel-shaped mounting strip or bracket 245 is secured by screws 245a in a recess in the inner ply 240a and has secured thereto a U-shaped clip or hook element 245b which is generally similar to the hook end 233 of the connector described above. The hook element 245b has a wedge fit in a tapered pocket member 245c mounted on the panel 47 in the same manner as the pocket member 236 at the opposite side of the panel. This wedge lock hanger or wedge pocket arrangement is a convenient multi-purpose device which can be utilized throughout my building system for hanging or attaching mouldings, panel coverings, compensating strips, chimney structure, etc. The pocket itself can have any desired internal clearance for mounting a plurality of articles when desired. It is also important to point out that the wedge pockets 245c and 236 are integrally associated with the wedge locked joints illustrated in Figs. 25 and 26. In other words, the wedge locking arrangement heretofore described for rigidly interlocking the edges of adjacent panel units (for example, in Figs. 3 to 5) also serves the auxiliary function of providing a cooperating attachment point for a clip or hook (such as 245d in Fig. 25) so as to facilitate mounting of supplementary panel covering or building fixtures.

Figs. 27 to 29 show certain details of construction at the juncture of a vertical inner wall with the ceiling of the building. The vertical wall panel is designated at 247 having the usual joint construction 248. A horizontal compensating strip structure is shown at 249 for interconnecting the vertical wall panel 247 with the upper grid-like platform. The details of this compensating strip structure 249 are generally similar to the structure 229 shown in Fig. 25 and need not be repeated. The upper edge of the compensating strip structure 249 is suspended from one of the upper cross beams 51, the latter having flanged bottom edges, as at 251, between which are supported the ceiling panel members. The ceiling panels are shown in this case as supported from elongated telescoping supports extending between respective flanges 251 of adjacent cross beams 51. Thus, in Fig. 27, an inner telescoping element 252 rests on the beam flange 251 and extends into an outer telescoping element 253 with a locking screw 254 extending through the telescoping elements for locking the same in any desired adjusted relationship to conform to the spacing between the cross beams 51. The telescoping support elements 252—253 extending between the parallel cross beams 51 provide a rigid mounting from which are suspended a plurality of interconnected light weight ceiling panels 256 having any desired decorative appearance. These ceiling panels 256 may be connected to the supports 253 by means of screws 257.

Around the periphery of the ceiling of the room, I may utilize a series of special corner or cove units, the inner edges of which are recessed, as at 258, to interfit with a corresponding shoulder 259 on the outermost ceiling panels 256. An upwardly extending clip or spring lug 261 is also fastened to the cove unit and secures the same to the uppermost ceiling support 253. The bottom or outermost decorative covering of the cove unit extends downwardly and outwardly, as at 262, to provide a smoothly curved attractive covering which completely conceals all of the structure between the ceiling and the vertical wall. Below the curved cove or concealing element 262 a molding unit 263 of any desired decorative configuration is secured horizontally around the room. The molding strips 263 may be conveniently secured to the wall panel 247 by means of attached U-shaped clips 264 which are received in tightly wedged relation in complementary wedge pockets 267 in the wall of the panel unit 247, the arrangement corresponding generally to that shown in Figs. 25-26. The molding 263 may contain an elongated trough 268 for housing suitable cove lighting, as at 269. The lower edge of the curved concealing panel 262 is beaded to provide a tight snap fit, as at 271, in a groove or channel at the upper edge of the trough 268.

In lieu of the ceiling panels 256 and the support means shown in Figs. 27-29, it may often be preferable to employ light weight panels of the same general type described herein for use as walls, etc. The panels are of a size such that they can be brought into the room through the doorways and a plurality of them are assembled and raised as a unit to the ceiling. Simple clips or the like may be used to suspend the ceiling panel assembly from the ceiling beam flanges, and the peripheral open space is filled by compensating strips of the character previously described or by cove units of the same general type shown in Fig. 27.

Figs. 30 and 31 illustrate certain details of the construction of the upper grid-like platform of the building including one method of securing the roof panel units thereto. In the broken view of Fig. 30 the opposite ends of the cross beams 51 are shown including their rigid connections with the opposed vertical walls, e.g. an outer eaves panel unit 49 and a mid-wall panel assembly comprising connected panel units 52 and 48. The eaves panel unit 49 has a single yoke type hanger, designated at 272, extending rigidly from the panel unit and interlocking with the spaced hook end portions of the beam 51 in the same general manner heretofore described in connection with Fig. 23. A pair of upper and lower wedge members 273 are shown, the wedges being interconnected by an elongated bolt 274 and a nut 276 for drawing the wedges 273 toward each other. A double hanger arrangement of this same general type is provided at the opposite or inner end of the beam 51. Thus, the upper mid-wall panel unit 52 has a yoke shaped hanger 277 and the lower vertical mid-wall panel 48 has a similar hanger 278. The hangers 277 and 278 are interlocked with sets of end hooks on the beam 51 and double sets of wedges 279 and 281 are also provided and are interconnected by elongated bolts as hereinbefore described. With this arrangement, the perpendicular positioning of the outer and mid-wall structures is insured.

The upper edge of the beam 51 which is defined by a channel member indicated at 282 slopes downwardly from the mid-wall to the outer wall of the building so as to support the inclined roof panel unit 53. Obviously, however, the same general structural arrangement can be employed in the case of a flat roof or a hip roof. This panel unit 53 has the same general core structure previously described but is equipped at its upper and lower ends with special interlocking connections. The connection at the lower end of the roof panel unit 53 in Fig. 30 comprises an apertured depending flange 283 extending rigidly from the frame of the panel unit and receiving in locked relation therewith an adjustable upturned hook 284. The hook 284 is carried by an elongated strip 286 having a preformed edge adapted to interlock and seal with the upper edge of the eaves panel unit 49 in much the same manner as previously described for the various panel joint means. The angular metal frame of the strip 286 has rigidly mounted thereon a clip or ring 285 for slidably guiding the hook 284. A pivotal humped plate 285a is mounted at the inner face of the strip 286 with the shank of the hook 284 extending therethrough and carrying a nut 284a. As the nut 284a is tightened, the action of the pivot plate 285a causes the strip 286 to interlock tightly with the upper edge of the panel 49 and at the same time the hook 284 is retracted and the roof panel 53 is pulled down.

The upper end edge of the roof panel unit 53 has a depending loop portion 287 which is rigid with the frame of the panel unit and is received within and retained by a U-shaped ridge strip 288 which extends horizontally along the apex of the roof and is rigidly mounted at the upper edge of the panel unit 52. An elongated cap strip formed from interlocking sections 289 extends over the gap between oppositely disposed roof panel units 53 and seals this opening. As seen in Fig. 31, the cap strip sections 289 are held together in end-to-end relation by pairs of interlocking lugs 291 secured to the cap strip sections. The cap strip 289 is held in place by means of a depending plate 292 to which is secured a plurality of straps or brackets 292a having apertures 293 therein. As seen in Fig. 30, these straps 292a extend downwardly into the upper mid-wall panel unit 52 and are locked to the mid-wall structure by means of wedge members 294 extending through the panel structure and the apertures 293.

Consequently, by the foregoing arrangement it will be seen that the roof panels are rigidly retained at their opposite ends and dimensional tolerances and variations are taken up by adjustment of the compensating hook connections 284 so as to insure rigid tight connections at all points. A gutter 296 may be mounted in sections at the shop on a plurality of brackets 297 along the outer faces of the eaves panels 49 and below the over-hanging edges of the roof panels 53. The gutter brackets 297 may be fastened to the eaves panels by any suitable means such as the fastening elements 298. Although the roof panels 53 are shown extending from the front and rear of the building to the mid-wall, it should be understood that under certain circumstances it may be preferred to have the elongated roof panels extend lengthwise of the building, i.e. between the ends thereof as seen in Fig. 1.

Figure 32:
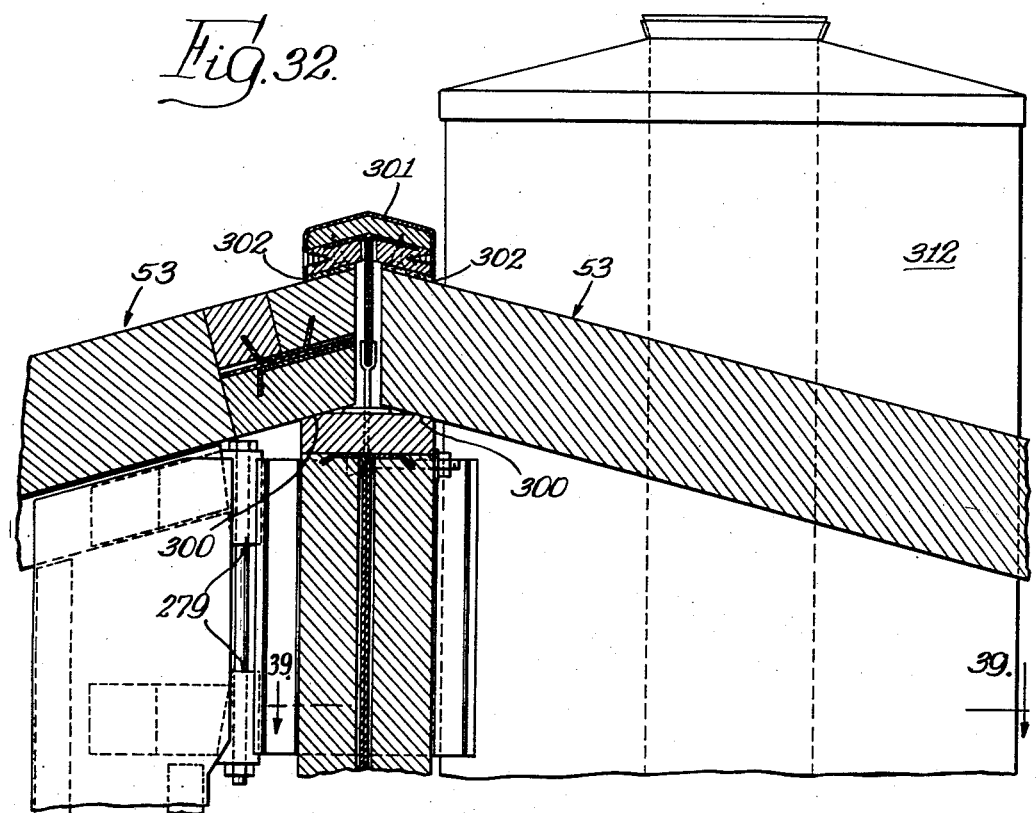
Figs. 32 and 33 are views generally similar to Fig. 30 but showing a modified form of eaves panel and roof panel joint and a different ridge cap construction.
Figure 33:
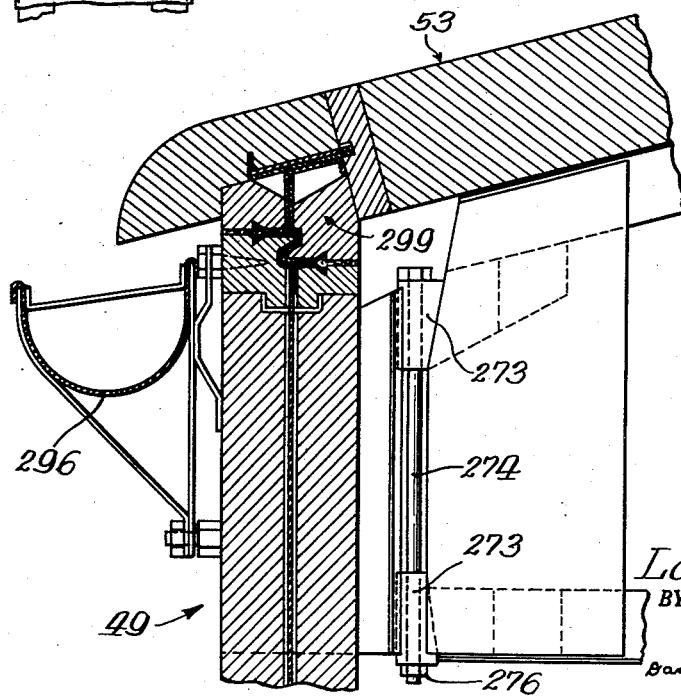

In Figs. 32 and 33 I illustrate a slightly different method of mounting the roof panel units 53. In this case, the lower end edges of the roof panel units are provided with rigidly attached connecting strips 299 having an interlocking edge portion adapted to interlock rigidly with the upper horizontal edge of the eaves panel unit 49. Thus, the connection at this point is a rigid connection without the compensating adjustable hook means 284 illustrated in Fig. 30. The upper end edges of the roof panels 53 in this case simply rest on the upper longitudinal edge of the mid-wall structure, as at 300, and no rigid connections are provided at this point. A ridge cap construction 301 is provided which is generally similar to the ridge cap 289 heretofore described. A sealing compound or gasket 302 may be provided for insuring a water tight seal of the cap strip 301 with the underlying edge portions of the roof panels 53. Thus, in this construction the upper ends of the roof panel units 53 are relatively free and unattached in order to accommodate expansion and dimensional variations, and to facilitate rapid assembly of the structure.

Fig. 34 illustrates still another modification of the roof panel connections. The eaves panel unit 49 and the roof panel unit 53 are illustrated with peripheral end edges of the splice joint type heretofore described in connection with Figs. 11 to 14. A curved shoulder strip portion 303 has mating edge portions for interconnecting the edges of the panel units 49 and 53, the joints being wedge locked by a screw actuated wedge means 304 similar to the Fig. 14 embodiment. Although not illustrated in detail, the curved shoulder strip 303 has the rigid frame and laminated cover construction typical of the basic panel units of my invention. In other words, the shoulder unit 303 is simply an elongated transversely curved panel unit which interlocks with the panel units 49 and 53 according to the general scheme of my invention. Fig. 35 shows the general manner in which the wedge blocks 273 at the beam connection coact with a pair of rigid abutments or thrust members 306 on the inner sides of the beam, which is the same general arrangement previously described in connection with Fig. 23. The curved shoulder strip feature can also be used at the rake of the roof or at the vertical corner connections of the building.

In Figs. 36 to 38 I have shown a special service panel arrangement for mounting the various service and utility lines which are incidental to a building structure of this character. The special service panel is designated at 307 and its general location will be clear from Fig. 1. The service panel 307 extends between a special outer base panel 40a and a special mid-wall base panel 43a and is rigidly secured therebetween by panel joint connections of the general type illustrated in Fig. 19. The service panel 307 is located closely adjacent a parallel cross beam 44 which extends between the same special panel units 40a and 43a for maximum structural rigidity for the service panel assembly. The various service lines such as water lines, sewage lines, gas lines, etc. are designated generally at 308. These service lines or conduits extend underground beneath the base panel units and thence upwardly closely adjacent the service panel 307 to which they are rigidly secured by appropriate clamps or straps 309. Thus, the only rigid connections between the various service lines and the building structure is through a single panel unit 307, it being understood that the various service lines extend upwardly from the panel 307 to the different parts of the building structure as required. Electric conduits 311 may likewise extend to the service panel 307 above grade. By means of this arrangement all of the service lines in the building may be attached to the service panel 307 in the shop and require merely connections with the main lines in the field. In addition, because the service panel is an integral part of the base structure or foundation of the building, all strain is taken from the piping which may, therefore, be of lighter weight construction.

One particular form of chimney construction which is particularly advantageous for use in my building system is illustrated in Figs. 32 and 39. The chimney structure comprises an outer rectangular housing 312 formed from a plurality of panel units 313 which are interconnected at their edges according to my general panel joint scheme in any of its various embodiments, and the entire housing structure is rigidly suspended from a vertical wall portion of the building such as a mid-wall structure 314. Obviously, the chimney could also be hung on outside wall structure, e.g. to accommodate a fireplace or the like. Suitable hanger elements 316 extend from vertical stud structures in the wall panel 314 for mounting the chimney housing 312. Other means of mounting the chimney housing such as by brackets or clips received in wedge pockets in the wall structure may also be employed. In the present instance, the chimney also comprises a pair of vertical flues 317 which are connected to the heating unit at their lower ends and are rigidly suspended in spaced relation within the housing 312 by means of a plurality of brackets 318. The brackets 318 are rigidly secured to the wall structure 314 by means of bolts or studs 319 extending from the bracket through the chimney housing 312 and into a mounting plate indicated at 321 which projects rigidly from the stud structure of wall panel unit 314. Circular clamps or bands, as at 322, surround the flues 317 and are bolted to the brackets 318. As will readily be seen, a substantial gas space is thus provided between the flues 317 and the surrounding insulated housing structure 312. By this arrangement, I am able to utilize a recirculating hot air heating system wherein air is circulated through the space between the flues 317 and the housing 312 in indirect heat exchange relationship with the hot flue gases being discharged upwardly through the flues 317. In many cases, this will result in a greatly improved efficiency of the heating plant since the air discharged to the rooms for heating purposes is heated not only by the furnace unit but also by heat exchange with the exit flue gases from the furnace.

From the foregoing detailed description it will be seen that my invention provides a highly practical prefabricated building system wherein each of the component features is specially designed and cooperates with the other structural features of the system to provide an integrated scheme of construction. In other words, the arrangement of interlocking discrete panel units, the interconnected panel and beam grid-like platforms, the wedge pocket hanger scheme, the use of wedge connected compensating strips, the roof and ceiling constructions, the special service panel feature, and the chimney structure are all inter-related and embody similar basic structural principles so as to cooperate and coact with each other to provide the desired integrated system. In addition, the system permits the use of cementitious fibrous covering material as cover strips for panel frames, as covers or enclosures for beams and the like, and as basic core panel covers whereby to impart highly desirable fireproof qualities to the building. Each unit or component of the system is flexible to meet the requirements of varied architectural treatment and permits wide latitude in choice of materials. Moreover, the design is such that the parts can be manufactured by high speed quantity production methods without impractical dimensional control and the components can be assembled in the field with a minimum labor cost.

Although the invention has been described in considerable detail in order to illustrate one or more specific means of carrying out the overall integrated building system, it will be understood that various modifications and equivalents may be resorted to without departing from the basic principles of the invention as defined in the appended claims.

I claim:

1. In a building structure, a foundation comprising a plurality of elongated horizontal base panel units rigidly interconnected in end-to-end relation to define a base perimeter, a plurality of cross beams operatively interconnecting oppositely disposed base panel units in said base perimeter for rigidly retaining the same in perpendicular position and whereby to define with said base perimeter a rigid grid-like lower platform, a plurality of vertical wall panel units supported at their lower ends on said base perimeter and rigidly interconnected therewith, said wall panel units also being rigidly interconnected along their vertical side edges to define a continuous outside wall structure, a plurality of elongated horizontal belt panel units rigidly interconnected in end-to-end relation to define an upper belt perimeter and also rigidly interconnected to the upper ends of said wall panels, and a plurality of cross beams operatively interconnecting oppositely disposed belt panel units in said belt perimeter for rigidly retaining the same in perpendicular position and whereby to define with said belt perimeter a rigid grid-like upper platform, each of said horizontal base and belt panel units comprising a rigid framework with covering means including a pair of cover panel members mounted on the framework at the opposite sides thereof and beam hanger means rigidly secured to the framework of the oppositely disposed panel units and projecting laterally beyond the cover panel members at the innermost sides of the panel units, and the cross beams of the respective upper and lower grid-like platforms being connected to the hanger means on said belt panel units and said base panel units, respectively.

2. The structure of claim 1 further characterized in that said base panel units have laterally enlarged portions along their lower horizontal edges providing footings as an integral part of the base panel unit structure for supporting the foundation on the ground and being adapted to be received directly in a field prepared trench or the like thereby eliminating the usual separate foundation structure.

3. The structure of claim 1 further characterized in that a roof structure is supported on the cross beams coacting with said belt perimeter.

4. The structure of claim 1 further characterized in that said panel units are each provided with complementary interfitting portions extending substantially the full peripheral length of the connecting edges of the panel units whereby to permit interconnection of all adjoining panel edges, and said panel units are also provided with locking means for drawing adjacent panel units edgewise toward each other and rigidly retaining adjacent panel edges in interlocked relation.

5. The structure of claim 4 further characterized in that said locking means comprises wedge-receiving pockets on said panel units and wedge means adapted to be forced into said pockets for drawing adjacent panel units together in interlocked relation.

6. In a building structure, a foundation comprising a plurality of elongated horizontal base panel units rigidly interconnected in end-to-end relation to define a base perimeter, said base panel units each having laterally enlarged portions along their lower horizontal edges providing footings as an integral part of the base panel unit structure for supporting the foundation on the ground without the necessity for a separate foundation structure, a mid-wall structure extending centrally of the building, a plurality of cross beams extending perpendicularly between and rigidly interconnecting said mid-wall structure and oppositely disposed base panel units in said base perimeter for rigidly retaining the same in perpendicular position and whereby to define with said base perimeter a rigid grid-like lower platform, a plurality of vertical wall panel units supported at their lower ends on said base perimeter and rigidly interconnected therewith, said wall panel units also being rigidly interconnected along their vertical side edges to define a continuous wall structure, a plurality of elongated horizontal belt panel units rigidly interconnected in end-to-end relation to define an upper belt perimeter and also rigidly interconnected to the upper ends of said wall panels, and a plurality of cross beams extending perpendicularly between and rigidly interconnecting said mid-wall structure and oppositely disposed belt panel units in said belt perimeter for rigidly retaining the same in perpendicular position and whereby to define with said belt perimeter a rigid grid-like upper platform, each of said horizontal base and belt panel units comprising a rigid framework with covering means including a pair of cover panel members mounted on the framework at opposite sides thereof and beam hanger means rigidly secured to the framework of said oppositely disposed panel units and projecting laterally beyond the cover panel members at the innermost sides of the panel units, and the cross beams of the respective upper and lower grid-like platforms being rigidly connected to the hanger means on said belt panel units and said base panel units, respectively.

7. The structure of claim 6 further characterized in that said mid-wall structure also comprises horizontal base panel units and superimposed vertical wall panel and horizontal belt panel units which are rigidly interconnected with each other to form the mid-wall, the base panel and belt panel units of the mid-wall structure each comprising a rigid framework with covering means including a pair of cover panel members mounted on the framework at opposite sides thereof and beam hanger means rigidly secured to said framework and projecting laterally beyond the cover panel members, the panel units at the ends of the mid-wall having rigid connections with the corresponding perpendicularly-extending panel units in the base perimeter, outside walls, and belt perimeter and the cross beams of the respective upper and lower grid-like platforms being rigidly connected to the hanger means on the belt panel and base panel units, respectively, of the mid-wall structure.

8. The structure of claim 1 further characterized in that elongated vertical free studs extend rigidly between the upper and lower grid-like platforms for imparting added strength and rigidity to the structure, each of said free studs being rigidly fitted at the juncture between a vertical wall and the end of a cross beam.

9. In a building structure, a plurality of elongated horizontal discrete panel units having interfitting edge portions rigidly interconnected with each other in end-to-end relation to define a generally rectangular perimeter structure adapted to be connected to vertical wall portions of the building, each of said panel units comprising a rigid framework with covering means including a pair of cover panel members mounted on the framework at opposite sides thereof, beam hanger means rigidly secured to the framework of oppositely disposed panel units and projecting laterally beyond the cover panel members at the innermost sides of the panel units, said hanger means being located inwardly of the peripheral extremities of the panel units, and a plurality of cross beams operatively interconnecting the hanger means on said oppositely disposed panel units in said perimeter structure for rigidly retaining the same in perpendicular position and whereby to define with said perimeter structure a rigid grid-like platform.

10. The structure of claim 9 further characterized by the provision of wedge locking means operatively coacting between said hanger means and said beams for drawing the same together and retaining the same in rigid interconnected relation.

11. In a building structure, a plurality of elongated horizontal panel units having interfitting edge portions rigidly interconnected with each other in end-to-end relation to define a generally rectangular perimeter structure adapted to be connected to vertical wall portions of the building, a mid-wall extending across one dimension of said rectangular perimeter structure and rigidly connected at its ends to oppositely disposed panel units in said perimeter structure, each of said panel units comprising a rigid framework with covering means including a pair of cover panel members mounted on the framework at opposite sides thereof, beam hanger means rigidly secured to the framework of oppositely disposed panel units across the other dimension of the perimeter structure and projecting laterally beyond the cover panel members at the innermost sides of the panel units, said hanger means being located inwardly of the peripheral extremities of the panel units, and a plurality of cross beams extending perpendicularly from and rigidly interconnecting said mid-wall with said hanger means for rigidly retaining the panel units in perpendicular position and whereby to define with said perimeter structure a rigid grid-like platform.

12. In a building structure, a plurality of elongated horizontal discrete panel units each comprising a rigid rectangular frame having a peripheral edge with complementary recessed and projecting portions, means defining a pair of panel-receiving beds at opposite sides of the frame, and a pair of rigid cover panel members press-fitted in parallel relation in said beds at opposite sides of the frame for enclosing the panel unit, said panel units being arranged in end-to-end relation with the complementary recessed and projecting portions of adjacent panel units being rigidly interfitted to define a generally rectangular perimeter structure adapted to be connected to vertical wall portions of the building, coacting cam portions on the peripheral edges of said panel units, wedge locking means operatively coacting with said cam portions at the interfitting panel edges for drawing the panel units together edgewise and rigidly holding the same in interlocked relation, the panel units at opposite sides of said perimeter structure being provided with hanger means rigidly mounted on the frames of the panel units and projecting from the cover panel members thereof, and a plurality of cross beams rigidly connected to said hanger means and operatively interconnecting said oppositely disposed panel units for rigidly retaining the same in perpendicular position and whereby to define with said perimeter structure a rigid grid-like platform.

13. The structure of claim 12 further characterized in that each of said panel units has a laterally-extending footing rigidly secured to the panel frame along the bottom horizontal edge therefor, said footing thereby constituting an integral part of the panel unit structure and being adapted to support the building directly on the ground whereby said perimeter structure comprises a foundation for the building.

14. In a building structure, a pair of oppositely disposed vertical walls, hanger means extending rigidly from said walls and having diverging outwardly turned flange portions, an elongated cross beam extending between said walls, said beam having spaced inwardly turned hook portions at its ends adapted to interlock with said flange portions of the hanger means, and wedge locking means operatively coacting between said beam and said hanger means for drawing together said flange portions and said hook portions and retaining the same in rigid interlocked relation whereby to retain said walls in perpendicular position.

15. In a building structure, a pair of oppositely disposed vertical walls, each of said walls comprising a panel unit having a rigid peripheral frame with a stud extending rigidly across the frame and cover means on opposite sides of the frame for enclosing the panel unit, hanger means projecting rigidly from said stud and comprising a yoke with diverging flange portions, a beam extending between the hanger means on the oppositely disposed walls, said beam being provided at each of its opposite ends with a pair of inwardly turned complementary hook portions adapted to engage in interlocking relation with said flange portions, thrust means on said beam in spaced relation from said hook portions, and vertically extending wedge means fitted between said thrust means and said flange portions for rigidly retaining said hook portions and said flange portions in locked relation whereby to retain said walls in perpendicular position.

16. In a building structure, a pair of oppositely disposed vertical walls, vertically elongated hanger means extending rigidly from each wall and comprising a pair of diverging flanged portions, an elongated cross beam extending perpendicularly between said walls, said beam having hooked end portions adapted to interlock with said flanged portions of the hanger means, a pair of upper and lower wedge members operatively coacting between said beam and said hanger means at the upper and lower ends of the latter for retaining said flanged portions and said hooked end portions in rigid interlocked relation whereby to hold said walls in perpendicular position, and elongated threaded means interconnecting said wedge members for uring the wedge members toward each other.

17. In a building structure, a vertical wall, hanger means extending rigidly from the wall and having a pair of diverging flanged portions, a beam having a pair of spaced hook portions at its end interengaged with said flanged portions, a pair of rigid abutments on said beam in spaced relation from the respective hook portions, and wedge means interposed between said abutments and said flanged portions for securing the beam to the hanger means.

18. In a building structure, a vertical wall, hanger means projecting rigidly from the wall and comprising a diverging yoke having a pair of outwardly-turned flanged end portions, a beam having at its end a pair of spaced inwardly-turned hook portions engaging said flanged portions, reinforcing members extending along the outside of the beam end and engaging said hook portions at the outside thereof for strengthening the same and resisting outward deflection thereof, and wedge means operatively coacting between said beam and said flanged portions for locking said flanged portions and said hook portions in rigid engagement.

19. In a building structure, a vertical wall, hanger means projecting rigidly from the wall and comprising a diverging yoke having a pair of outwardly-turned flanged end portions, a beam having at its end a pair of spaced inwardly-turned hook portions engaging said flanged portions, wedge means operatively coacting between said beam and said flanged portions for locking said flanged portions and said hook portions in rigid engagement, a pair of elongated vertical free studs fitted in spaced relation at the opposite sides of said hanger means between said wall and the end of the beam for strengthening and stiffening said wall, and means rigidly interconnecting said free studs for retaining the same in position.

20. In a building structure, a vertical wall, hanger means extending rigidly from the wall and providing a vertically extending connection having a projecting edge portion and a laterally extending recessed edge portion, a horizontal beam having a vertically extending end connection with complementary projecting and recessed edge portions interfitted with the complementary portions of said hanger means, said projecting edge portions being provided with aligned apertures, and wedge locking means operatively coacting with said hanger means and the end connection on said beam, said wedge locking means comprising wedge pocket means rigidly mounted on one of said projecting edge portions, a cam member disposed in said pocket means and having a tapered portion projecting through said aligned apertures, and adjustable means coacting between said pocket means and said cam member for urging the tapered portion of the latter inwardly into camming engagement with the edges of said apertures for drawing said hanger means and said end connection together and retaining them in rigid interlocked relation whereby said wall is maintained in perpendicular position.

21. In a building structure, a pair of wall structures disposed in perpendicular spaced relation, attaching means extending rigidly from each of said wall structures, and elongated adjustable compensating strip means disposed in and filling the space between said wall structures, said compensating strip means including a plurality of connectors fixedly engaged with the attaching means on one of said wall structures, adjustable wedge means rigidly interconnecting said connectors with the attaching means on the other of said wall structures, and elongated cover strips mounted in opposed relation between said wall structures on opposite sides of said connectors for concealing the connectors and filling the space between said wall structures.

22. A panel unit construction for use in a building structure comprising a rigid peripheral frame, cover strips mounted on said frame and enclosing the same, said cover strips defining a pair of panel-receiving beds at opposite sides of the frame, and a pair of rigid cover panel members tightly press-fitted within said beds in parallel spaced relation at opposite sides of the panel unit, said beds opening laterally outwardly from the plane of the panel unit for substantially the full area of the cover panel members whereby said cover panel members can be inserted in the beds by pressing movement in a direction substantially perpendicular to the plane of the panel unit, the inserted cover panel members thereby being frictionally gripped around the outer peripheral edges thereof.

23. The panel unit of claim 22 further characterized in that said frame is placed in tension and said cover panel members are placed in compression by reason of the press-fitted relation therebetween and whereby the overall strength and rigidity of the panel unit is improved.

24. The panel unit of claim 22 further characterized in that said cover panel members comprise a cementitious fibrous material.

25. The structure of claim 22 further characterized in that a plurality of anchor elements are mounted on said frame, said anchor elements having oppositely extending portions embedded in the oppositely disposed cover panel members for resisting outward bulging of the latter.

26. The structure of claim 22 further characterized in that said cover strips are secured on said frame by means of a plurality of generally U-shaped retainer elements engaging oppositely disposed cover strips and holding the latter in clamping relation at opposite sides of the frame.

27. The structure of claim 22 further characterized in that the frame of said panel unit is laterally enlarged along one horizontal edge portion thereof and the cover strips enclosing said horizontal edge portion extend laterally beyond the confines of the panel unit whereby to provide an attached footing comprising an integral part of the panel unit and adapted to be supported directly on the ground as a base panel without the usual separate foundation structure, and a retaining strip straddling said cover strips for frictionally retaining the same on the frame.

28. The panel unit of claim 22 further characterized in that said cover panel members are provided with supplemental outer covering secured to said panel members by wedge locking means coacting therebetween.

29. The structure of claim 22 further characterized in that a window frame is disposed within said peripheral frame and occupying at least a portion of said beds, said window frame being connected to said peripheral frame and said rigid cover panel members being tightly press-fitted within the portions of said beds not occupied by said window frame.

30. A panel unit construction for use in a building structure comprising a rigid peripheral frame, said frame having a cross-sectional shape providing an outer peripheral edge with cooperating recessed and projecting portions adapted to interfit with complementary edge portions of a similar panel unit, cover strips mounted on said frame and enclosing the same, said cover strips defining a pair of panel-receiving beds at opposite sides of the frame, and a pair of rigid cover panel members tightly press-fitted within said beds in parallel spaced relation at opposite sides of the panel unit, said beds opening laterally outwardly from the plane of the panel unit for substantially the full area of the cover panel members whereby said cover panel members can be inserted in the beds by pressing movement in a direction substantially perpendicular to the plane of the panel unit, the inserted cover panel members thereby being frictionally gripped around the outer peripheral edges thereof.

31. The panel unit of claim 30 further characterized in that the recessed peripheral edge portion of said frame has mounted thereon a compressible sealing means for insuring a tight sealed joint when similar panel units are interlocked.

32. A panel unit construction for use in a building structure comprising a rigid peripheral frame formed from connected pairs of elongated angle elements, elongated cover strips mounted on said frame and enclosing the same, said frame with attached cover strips providing a generally L-shaped cross-section with one leg thereof extending outwardly parallel to the plane of the panel unit and defining a projecting panel edge portion and the other leg thereof extending generally perpendicularly to the plane of the panel unit and defining a recessed panel edge portion whereby said projecting and recessed edge portions can be interfitted with complementary portions of another similar panel unit, said cover strips also defining a pair of panel-receiving beds at opposite sides of the frame, and a pair of rigid cover panel members tightly press-fitted within said beds in parallel spaced relation at opposite sides of the panel unit.

33. In a building structure, a pair of discrete panel units each comprising rigid frame means, cover panels mounted on said frame means in parallel spaced relation at opposite sides thereof, the frame means of said panel units having interfitting peripheral edges with cooperating projecting and recessed portions, the projecting portions of the panel edges being disposed in overlapping relation and having coacting angular cam portions and wedge locking means disposed at one side of said panel units and laterally accessible through said cover panels and operatively coacting between the frame means of the respective panel units for urging the panel units laterally toward each other whereby said angular cam portions cause the panel units to be drawn together edgewise and to be rigidly retained in locked relation at the interfitting edges thereof.

34. The structure of claim 33 further characterized in that the projecting portion on the interfitting peripheral edge of one of said panel units extends outwardly at an angle to the plane of said one panel unit whereby to provide, in cooperation with the other panel unit, a corner for the building structure.

35. The structure of claim 33 further characterized in that one of said panel units has a transverse curvature for providing a curved corner portion on the building structure.

36. In a building structure, a pair of discrete panel units each comprising a rigid peripheral frame, cover strips mounted on the frame and enclosing the same, said cover strips defining a pair of panel-receiving beds at opposite sides of the frame, and a pair of rigid cover panel members tightly press-fitted within said beds in parallel spaced relation at opposite sides of the panel unit; the frame and attached cover strips of each panel unit having a generally L-shaped cross-section with one leg thereof extending outwardly parallel to the plane of the panel unit and defining a projecting panel edge portion and the other leg thereof extending generally perpendicularly to the plane of the panel unit and defining a recessed panel edge portion; said panel units being fitted together at their edges with the projecting and recessed edge portions of one panel unit interlocking with the complementary edge portions of the other panel unit; and wedge locking means for holding the panel units rigidly in interlocked relation, said wedge locking means comprising coacting inclined cam portions on the projecting edge portions of the respective panel frames, wedge pocket means rigidly connected to one of said panel frames, and wedge means operatively coacting between said wedge pocket means and the other of said panel frames for urging the respective panel units laterally toward each other whereby said inclined cam portions cause the panel units to be drawn together edgewise and to be rigidly retained in locked relation at the interfitting edges thereof.

37. In a building structure, a pair of discrete panel units each comprising a rigid peripheral frame, cover strips mounted on the frame and enclosing the same, said cover strips defining a pair of panel-receiving beds at opposite sides of the frame, and a pair of rigid cover panel members tightly press-fitted within said beds in parallel spaced relation at opposite sides of the panel unit; the frame and attached cover strips of each panel unit having a generally L-shaped cross-section with one leg thereof extending outwardly parallel to the plane of the panel unit and defining a projecting panel edge portion and the other leg thereof extending generally perpendicularly to the plane of the panel unit and defining a recessed panel edge portion; said panel units being fitted together at their edges with the projecting and recessed edge portions of one panel unit interlocking with the complementary edge portions of the other panel unit; the outwardly extending leg portions of the panel frames being provided with apertures adapted to overlap when the panel units are interfitted; and wedge locking means for holding the panel units rigidly in interlocked relation, said locking means comprising wedge pocket means rigidly mounted on one of the panel frames, a cam member disposed in said pocket means and having a tapered portion projecting through said overlapping apertures in the panel frames, and adjustable means coacting between said pocket means and said cam member for urging the tapered portion of the latter inwardly into camming engagement with the edges of said apertures whereby the respective panel frames are drawn together edgewise and rigidly retained in locked relation at the interfitting panel edges.

38. In a building structure, a pair of discrete panel units each comprising a rigid peripheral frame, cover strips mounted on the frame and enclosing the same, said cover strips defining a pair of panel-receiving beds at opposite sides of the frame, and a pair of rigid cover panel members tightly press-fitted within said beds in parallel spaced relation at opposite sides of the panel unit; the frame and attached cover strips of each panel unit having a generally L-shaped cross-section with one leg thereof extending outwardly parallel to the plane of the panel unit and defining a projecting panel edge portion and the other leg thereof extending generally perpendicularly to the plane of the panel unit and defining a recessed panel edge portion; said panel units being fitted together at their edges with the projecting and recessed edge portions of one panel unit interlocking with the complementary edge portions of the other panel unit; the outwardly extending leg portions of the panel frames being provided with apertures adapted to overlap when the panel units are interfitted; and wedge locking means for holding the panel units rigidly in interlocked relation, said locking means comprising a pair of coacting wedge elements in respective camming engagement with the edges of said apertures, and an adjustable actuating member extending loosely through one of said wedge elements and threadedly engaged with the other of said wedge elements for urging said wedge elements together whereby the respective panel frames are cammed together edgewise and rigidly retained in locked relation at the interfitting panel edges.

39. In a building structure, a pair of discrete panel units each comprising a rigid peripheral frame, cover strips mounted on the frame and enclosing the same, said cover strips defining a pair of panel-receiving beds at opposite sides of the frame, and a pair of rigid cover panel members tightly press-fitted within said beds in parallel spaced relation at opposite sides of the panel unit; the frame and attached cover strips of each panel unit having a generally L-shaped cross-section with one leg thereof extending outwardly parallel to the plane of the panel unit and defining a projecting panel edge portion and the other leg thereof extending generally perpendicularly to the plane of the panel unit and defining a recessed panel edge portion; said panel units being fitted together at their edges with the projecting and recessed edge portions of one panel unit interlocking with the complementary edge portions of the other panel unit; and wedge locking means for holding the panel units rigidly in interlocked relation, said wedge locking means comprising coacting inclined cam portions on the projecting edge portions of the respective panel frames, and a rotatable locking member having a flange portion engaging one of said panel frames and a tapered wedge portion engaging the other of said panel frames so that upon rotation of said locking member to locking position the respective panel units are urged laterally toward each other whereby said inclined cam portions cause the panel units to be drawn together edgewise and to be rigidly retained in locked relation at the interfitting edges thereof.

40. In combination, a pair of structural members having interfitting projecting and recessed portions, the respective projecting portions being disposed in overlapping relation and having coacting angular cam portions, and wedge locking means operatively coacting between said structural members for urging the members laterally toward each other whereby said angular cam portions cause the members to be drawn together edgewise and to be rigidly retained in locked relation at the interfitting edges thereof.

41. In combination, a panel unit including a rigid frame portion, a wedge pocket member rigidly secured to said frame portion and having a tapered recess, and a generally U-shaped fastener having one leg portion tapered to provide a complementary wedge fit in said recess, said fastener projecting transversely from the plane of said panel unit and having its other leg portion adapted to be rigidly secured to adjacent structure.

42. In combination, a pair of structural members having interfitting projecting and recessed portions, the respective projecting portions being disposed in overlapping relation and having coacting angular cam portions, and wedge locking means operatively coacting between said structural members for urging said members laterally toward each other whereby said angular cam portions cause the members to be drawn together edgewise and to be rigidly retained in interfitting relation, said wedge locking means including a member having a generally U-shaped cross-section providing a recess adapted to receive a clip member for mounting an additional structural element.

(References on following page)

References Cited in the file of this patent

UNITED STATES PATENTS

| | | | |
|---|---|---|---|
| 334,587 | Jillson | Jan. 19, | 1886 |
| 432,397 | Gilbert | July 15, | 1890 |
| 794,595 | Ducker | July 11, | 1905 |
| 1,535,504 | Stephens | Apr. 28, | 1925 |
| 1,539,801 | Davidson | May 26, | 1925 |
| 1,733,169 | Purdy | Oct. 29, | 1929 |
| 1,832,078 | Zahner et al. | Nov. 17, | 1931 |
| 1,981,661 | Peeifer | Nov. 20, | 1934 |
| 2,010,552 | McDermott | Aug. 6, | 1935 |
| 2,023,604 | Lovejoy | Dec. 10, | 1935 |
| 2,053,873 | Niederhofer | Sept. 8, | 1936 |
| 2,058,285 | Amescua | Oct. 20, | 1936 |
| 2,094,607 | Kotrbaty | Oct. 5, | 1937 |
| 2,101,952 | Olsen | Dec. 14, | 1937 |
| 2,108,065 | Kotrbaty | Feb. 15, | 1938 |
| 2,140,772 | Slayter et al. | Dec. 20, | 1938 |
| 2,169,255 | Kotrbaty | Aug. 15, | 1939 |
| 2,183,381 | McLaughlin | Dec. 12, | 1939 |
| 2,205,730 | Morgan | June 25, | 1940 |
| 2,230,249 | Henning | Feb. 4, | 1941 |
| 2,345,500 | Petter | Mar. 28, | 1944 |
| 2,391,960 | Gede | Jan. 1, | 1946 |
| 2,414,628 | Battin | Jan. 21, | 1947 |
| 2,447,272 | Parkes | Aug. 17, | 1948 |
| 2,453,326 | Lambert | Nov. 9, | 1948 |
| 2,616,533 | Gannett et al. | Nov. 4, | 1952 |
| 2,629,138 | Hultquist | Feb. 24, | 1953 |
| 2,651,391 | Havens | Sept. 8, | 1953 |
| 2,653,553 | Jacobs | Sept. 29, | 1953 |
| 2,667,241 | Shannon | Jan. 26, | 1954 |
| 2,680,502 | Kurtzon | June 8, | 1954 |

FOREIGN PATENTS

| | | | |
|---|---|---|---|
| 157,139 | Great Britain | July 10, | 1922 |
| 113,033 | Australia | May 2, | 1941 |
| 698,956 | Great Britain | Oct. 28, | 1953 |